(12) United States Patent
Klassen et al.

(10) Patent No.: US 11,168,762 B2
(45) Date of Patent: Nov. 9, 2021

(54) GEARBOX

(71) Applicant: Genesis Advanced Technology Inc., Surrey (CA)

(72) Inventors: James Brent Klassen, Surrey (CA); Richard Bos, Surrey (CA)

(73) Assignee: Genesis Advanced Technology Inc., Surrey (CA)

( * ) Notice: Subject to any disclaimer, the term of this patent is extended or adjusted under 35 U.S.C. 154(b) by 0 days.

(21) Appl. No.: 16/759,807

(22) PCT Filed: Nov. 8, 2018

(86) PCT No.: PCT/CA2018/051419
§ 371 (c)(1),
(2) Date: Apr. 28, 2020

(87) PCT Pub. No.: WO2019/090430
PCT Pub. Date: May 16, 2019

(65) Prior Publication Data
US 2021/0180665 A1   Jun. 17, 2021

Related U.S. Application Data

(60) Provisional application No. 62/583,484, filed on Nov. 8, 2017, provisional application No. 62/757,158, filed on Nov. 7, 2018.

(51) Int. Cl.
*F16H 1/28* (2006.01)
*F16H 57/08* (2006.01)
*F16H 55/08* (2006.01)

(52) U.S. Cl.
CPC .............. *F16H 1/28* (2013.01); *F16H 57/08* (2013.01); *F16H 57/082* (2013.01); *F16H 55/088* (2013.01); *F16H 2057/085* (2013.01)

(58) Field of Classification Search
None
See application file for complete search history.

(56) References Cited

U.S. PATENT DOCUMENTS

| 5,957,805 A | 9/1999 | Schulz et al. |
| 10,132,392 B2 * | 11/2018 | Klassen ............... F16C 19/505 |

(Continued)

FOREIGN PATENT DOCUMENTS

| DE | 10-2001-037540 A1 | 3/2006 | |
| JP | 59080551 A * | 5/1984 | ............... F16H 1/36 |

(Continued)

OTHER PUBLICATIONS

International Searching Authority, International Search Report and Written Opinion for International Application No. PCT/CA2018/051419, dated Feb. 6, 2019, (10 pages), Quebec, Canada.

(Continued)

*Primary Examiner* — Dirk Wright
(74) *Attorney, Agent, or Firm* — Alston & Bird LLP

(57) ABSTRACT

A planetary gearbox with two rows of planets between an inner race and a coaxial outer race. An input gear may also mesh with the inner planets or the outer planets. To avoid unmeshing of the gears due to twisting from the applied torque, a camming effect may be used in which applied torque generates a radial preload. The gears that mesh with the input gear may do so at portions of the gears that also mesh with a corresponding one of the inner or outer race. The planets may be geared with axial portions with different helix angle. The inner race or outer race may be formed of two components geared with different helix angle to mesh with the different axial portions of the planets. By using these different components, assembly is eased as the components can be slid onto the planets axially.

12 Claims, 26 Drawing Sheets

(56) References Cited

U.S. PATENT DOCUMENTS

| | | |
|---|---|---|
| 2012/0132024 A1 | 5/2012 | Mittermair et al. |
| 2017/0181916 A1 | 6/2017 | Klassen |
| 2017/0184185 A1 | 6/2017 | Schorsch |

FOREIGN PATENT DOCUMENTS

| | | | | |
|---|---|---|---|---|
| JP | 2015-517641 A | 6/2015 | | |
| WO | WO-2005/106265 A1 | 11/2005 | | |
| WO | WO-2011098182 A1 * | 8/2011 | ............... | F16H 1/36 |
| WO | WO-2011/130360 A1 | 10/2011 | | |
| WO | WO-2013/173928 A1 | 11/2013 | | |

OTHER PUBLICATIONS

Notification of Reason For Rejection for Japanese Application No. 2020-542478, dated Jun. 24, 2021, (11 pages), Japan Patent Office, Tokyo, Japan.

* cited by examiner

GEARBOX

CROSS REFERENCE TO RELATED APPLICATIONS

This application is a National Stage Application, filed under 35 U.S.C. § 371, of International Application No. PCT/CA2018/051419, filed Nov. 8, 2018, which claims priority to U.S. Application No. 62/583,484, filed Nov. 8, 2017, and U.S. Application No. 62/757,158, filed Nov. 7, 2018; the contents of all of which are hereby incorporated by reference in their entirety.

BACKGROUND

Related Field

Gearboxes.

Description of Related Art

In published patent application no. WO2013173928A1 a device is shown which increases torque with two rows of rollers all of which are contacting two other rollers and at a high enough number of rollers that a low camming angle is achieved. Below this angle, the camming action increases the tractive pressure at the contacts between the inner and outer rollers and between the inner rollers and the inner race and between the outer rollers and the outer race.

Achieving a coefficient of friction that is high enough to allow this camming action to happen is a challenge, because many common material combinations, such as steel on steel, have a lower Coefficient of Friction (CF) than necessary for a typical camming angle for this device. As a result materials such as nickel alloys and other material combinations must be used to achieve a high enough CF to allow the camming angle geometry to provide a tractive pressure that is proportional to the torque being transmitted.

Another challenge with a rolling contact version is to keep the rollers all equally circumferentially spaced. A rolling contact does not "clock" itself relative to the other rollers, and the two rows of rollers are inherently unstable if the circumferential spacing of the rollers is not controlled. By unstable, what is meant is that the inner race will not stay concentric with the outer race if the rollers become unequally spaced.

Another challenge of a pure roller version of the present device (with no gear teeth) is keeping the rollers axially aligned with each other and with the races.

Another challenge of embodiments of a pure roller version of the device is that bearings are required to keep the outer race axially aligned with the inner race.

Another challenge of embodiments of a roller or geared version of this device is that torque must be provided to the rollers through an input device such as a geared ring with an inner gear that meshes with the inner roller array or an outer gear that meshes with the outer roller array.

Geared devices such as conventional gear reducers will commonly use a planet carrier to position the planets. A planet carrier adds rotational mass, cost and complexity.

BRIEF SUMMARY

There is provided a speed change device having an inner race having an outer surface and defining an axis and an outer race having an inner surface and coaxial with the inner race. The speed change device has a set of orbital rollers including inner rollers in geared contact with the outer surface of the inner race and outer rollers in geared contact with the inner surface of the outer race, each and every inner roller being in geared contact with two outer rollers, and each and every outer roller being in geared contact with two inner rollers. There may be an input ring coaxial with the inner race and outer race and in geared contact with the inner rollers or with the outer rollers.

In one embodiment, one of A or B is the case in which A is the outer rollers are longer than the inner rollers and each outer roller has a respective first portion that meshes with the inner rollers with which it is in contact, and the input ring has an outer surface that meshes with a respective second portion of each outer roller with which it is in contact, both the first portions and the second portions of the outer rollers meshing with the outer race; and B is inner rollers are longer than the outer rollers and each inner roller has a respective first portion that meshes with the outer rollers with which it is in contact, and the input ring has an inner surface that meshes with a respective second portion of each inner roller with which it is in contact, both the first portions and the second portions of the inner rollers meshing with the inner race.

In another embodiment, the inner and outer rollers have a length in geared contact, and the gears and races have respective diameters, selected to cause torque on the input ring to cause increased radial loading of the inner and outer rollers sufficient to overcome a separating force caused by the torque on the input ring.

In another embodiment, at least one of the outer surface of the inner race and the inner surface of the outer race are formed of two angled gear surfaces having different helix angle. The two angled gear surfaces may be positioned on axially adjacent components. This arrangement may be used to enable the components to be moved axially into gear meshing contact with the planetary gears, easing assembly.

Any of these embodiments may be combined.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION OF VARIOUS EMBODIMENTS

Figure 1:
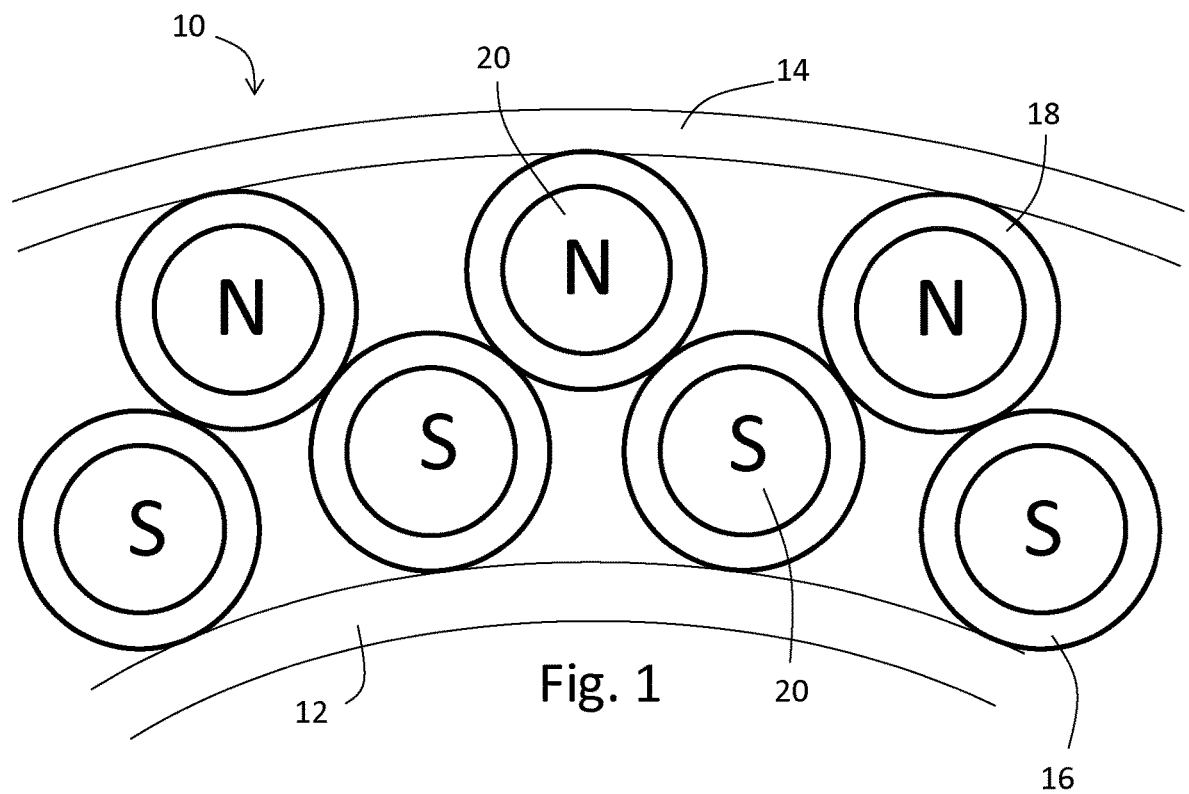
FIG. 1 is a simplified schematic axial end view of a portion of a motor comprising a gearbox with magnetic pinions.

Immaterial modifications may be made to the embodiments described here without departing from what is covered by the claims.

Embodiments of the present device eliminate the need for a planet carrier by transmitting torque from an inner fixed ring to an outer output ring directly through two rows of planets. The gear reduction ratio is determined by the difference between the OD of the inner ring and the ID of the outer ring with the inner and outer planets acting as a torque transfer load path between them. As the planets are caused to orbit, the outer ring will rotate at a ratio such as approximately 3:1 or possibly lower, or up to approximately 6:1 or possibly higher. The closer the OD of the inner ring is to the ID of the outer output ring, the greater the ratio.

Embodiments of the device disclosed here use a combination of features to provide equal circumferential spacing as well as axial alignment of the rollers and races as well as eliminating the need for additional bearings in some applications or reducing the strength (and therefore the cost and weight) of the additional bearings by virtue of the interaction of the rollers and races providing axial alignment from the inner race to the outer race. Furthermore, embodiments of the device disclosed here provide a structure that applies a magnetic force directly to the rollers to eliminate the need for a separate motor rotor where the rollers themselves act as the rotor with a reduction ratio because they are orbiting at a higher speed than the output ring. This eliminates the need for a sun ring input which simplifies the manufacturing and assembly of the motor-gearbox combination. The fact that the rollers (and therefore the contained magnets) are spinning is not believed to be a significant detriment because they are still providing magnetic flux to the airgap and stator.

Embodiment of the device use gears or lobes that are small enough and numerous enough to provide what acts and feels more like a rolling contact than a gear. In the claims, the term "lobes" also encompasses the term "gears". Lobes have the advantage of providing a high surface area in the radial direction (as opposed to a gear that has gear teeth which act like wedges). In an example, the pressure angle of the lobes or gears may be greater than 20, 30 or 40 degrees. In an alternate configuration, high angled gears can be used instead of lobes. By configuring the gears or lobes in a herringbone configuration, a number of characteristics can be achieved, including: circumferential roller spacing as a result of the gear-specified circumferential positioning of the rollers; axial alignment of rollers to races and inner rollers to outer rollers as a result of the herringbone helical gears; and the ability to eliminate or reduce the need for a bearing between the inner and outer races because the herringbone gears on the rollers provide multi-axis (IE: radial and axial location) constraints. The use of permanent magnets in the rollers allows one or preferably two electromagnetic stators positioned on axial ends of the device to be commutated in such a way as to impart rotational torque and motion to the rollers, and by doing so to generate torque on the outer ring (using the inner ring as a fixed reference in these non-limiting examples, although it is understood that the outer ring can be used as the fixed reference and the inner ring can be the output ring. It is also understood that the stator/s can be attached to the inner or outer ring regardless of which one is fixed and which one is the output).

Embodiments Including Permanent Magnets

A typical conventional differential gear with a planet carrier cannot use PMs in the planets because it requires bearings and shafts in the pinions. Furthermore, if a conventional planetary gear (with a single circular array of planets) uses PMs in the planets together with a fixed sun gear it will act as a speed increaser rather than as a reducer.

In FIG. 1, a simplified schematic is shown of a section of a non-limiting exemplary embodiment of the device 10. An inner race 12 acts as a fixed or reference race, an outer race 14 acts as an output member, and respective arrays of inner rollers 16 and outer rollers 18 impart torque form the inner race 12 to the outer race 14 when they orbit. In order to cause the rollers to orbit, embodiments of the device have a permanent magnet 20 imbedded in one or more of the rollers and preferably, as shown in FIG. 1, all of the inner and outer rollers.

Figure 2:
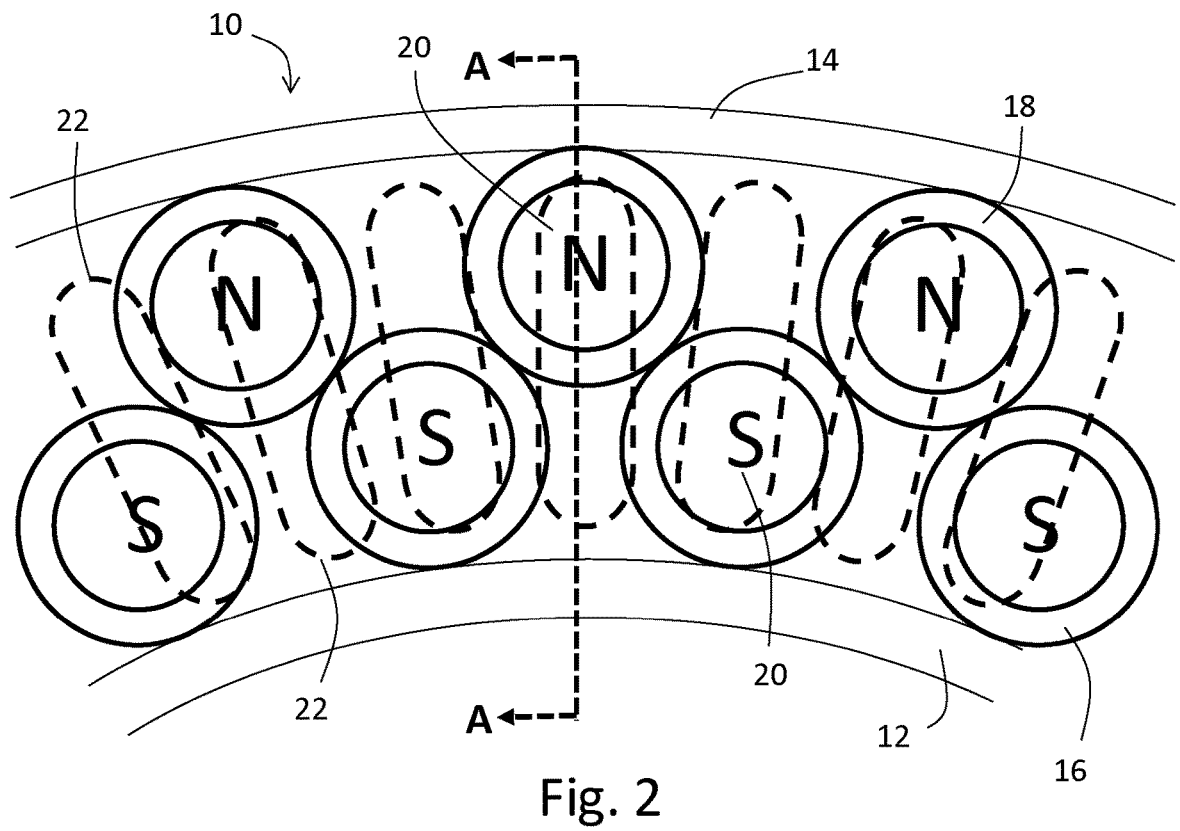
FIG. 2 is a simplified schematic axial end view of the portion of a motor of FIG. 1, also showing electromagnetic stator poles/posts represented by dashed lines.
Figure 3:
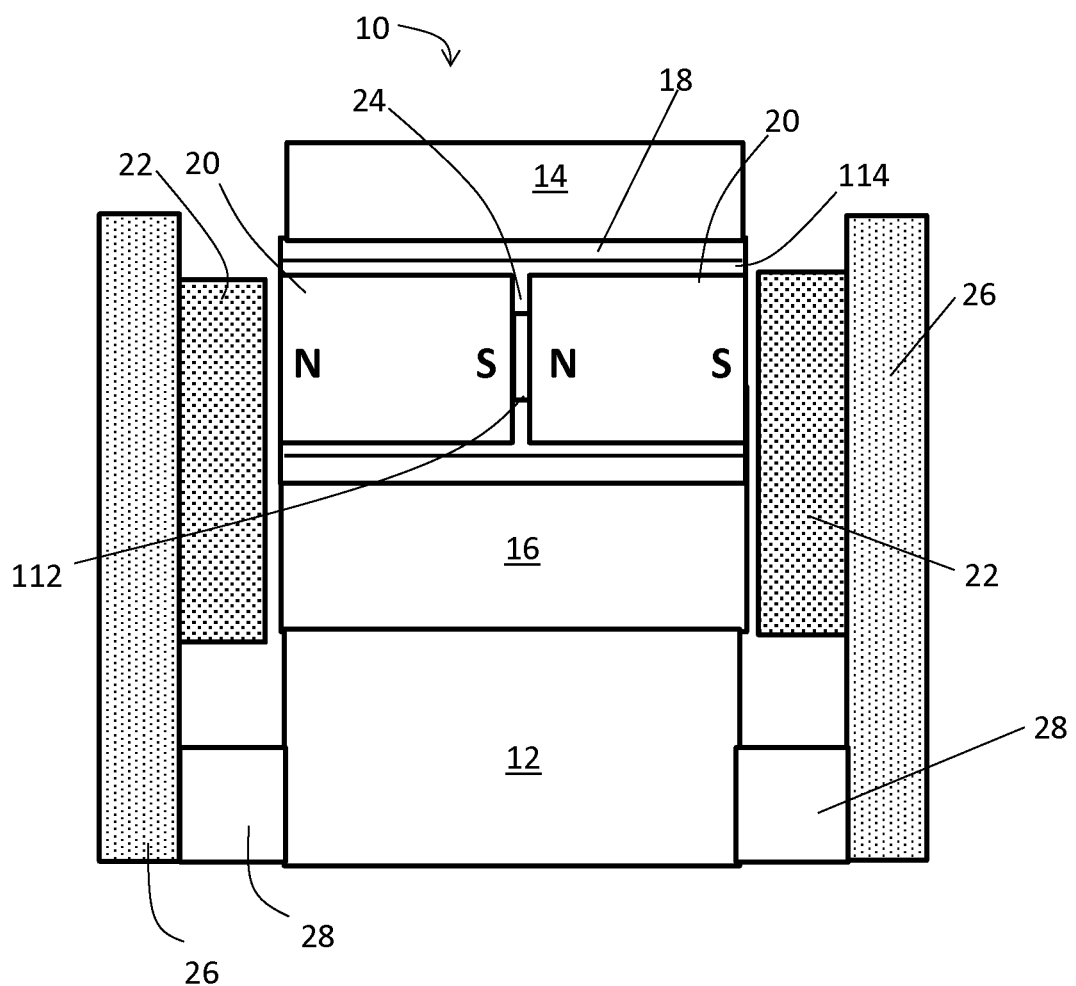
FIG. 3 is a schematic circumferential section view of the exemplary embodiment in FIG. 2 with a partially assembled stator on both axial ends of the rollers.

FIG. 2 shows a simplified schematic view of an embodiment of the device 10 with electromagnetic stator poles/posts 22 represented by dashed lines. A range of numbers of rollers and posts can be used such as could be used in a conventional electric motor and stator such as 72 stator posts and 68 rollers. The number of rollers in this non-limiting example includes 34 inner rollers and 34 outer rollers. The stator may have electromagnets with posts or air coils. Also shown in FIG. 2 is a section line A-A showing where the cross section view of FIG. 3 is cut. The section line cuts through an outer roller but between inner rollers. If air coils are used, it is preferable to have a soft magnetic material backiron 26 to carry flux from each air coil 22 to each adjacent air coil 22.

FIG. 3 shows a schematic cross section of the non-limiting exemplary embodiment in FIG. 2 with a partially assembled stator on both axial ends of the rollers. (Coils on electromagnetic elements are not shown). The placement of the permanent magnets 20 is such that two magnets are used and placed in the outer rollers 18 from either end such that they pull together across a separating or axially locating member 24. This allows the magnets to be held in the rollers without the need for additional securing means. This provides the full end of the magnet for propulsive force when interacting with the electromagnetic stator poles 22. Other means of inserting and securing the magnets may also be used. The inner rollers may use the same or different arrangement as the outer rollers. Stator elements including poles (here air coils) 22 and backiron 26 are shown schematically. As shown, the stator elements may be on both axial sides of the device 10. The stator may be attached to a fixed element, here the inner race 12. Here, spacers 28 are used to connect the backiron 26 to the inner race 12.

The axially locating member 24 need not separate the magnets. The member 24 merely prevents the magnets from moving together. If separated, such as with two simple cylindrical PMs that are separated by a ring of plastic (if plastic gears are used) to form axially locating member 24, then there needs to be a soft magnetic material, such as steel, disk 112 between them. This is a preferred construction in terms of cost and simplicity.

The axial location element 24 is preferably molded or fabricated as one piece with at least an inner portion 114 (inner diameter) of the rollers. The entire roller can be formed as a single piece, or the gear faces of the roller may be one or more separate pieces into which the inner portion 114 is inserted. A soft magnetic material, such as steel disk 112, is preferably used as a flux linkage path between the two magnets. The PMs could also have a smaller diameter cylindrical end section instead of the soft magnetic material disk. Simple cylindrical magnets are considered to be less expensive to build, and the use of a steel disk spacer for flux linkage between them allows this disk to be easily adjusted to the ideal thickness (whereas PMs are more difficult to machine to the same tolerance).

The embodiment shown in FIGS. 1-3 has 2 rows of pinions (rollers) of similar size, with magnets in the pinions of each row. The magnets have (as viewed from one axial side) all N in one array and all S in the other array, as seen in FIGS. 1 and 2. Some configurations use one array of pinions that are much smaller than the other. In this case it may be better to put magnets in only the larger pinions. The benefits include a lighter stator due to smaller radial dimension. The magnets can be restricted to one row regardless of the pinion sizes. An example, shown in versions with 16 and 14 pinion per row respectively in FIGS. 4-5, has larger outer rollers 18 with magnets 20 only in the outer array.

This single row of magnets configuration has alternating polarities of the magnets in single array of PM pinions.

The stator may have a number of poles. Each pole can be for example an electromagnet having a post, or an air coil. For a conventional three phase motor, the stator needs to have a number of poles divisible by 3 (the term "poles" or "posts" when referring to the stator, refers to each individual post and coil, or coil, if air coils are used). It can also be useful to have the number of poles divisible by 4, so if it is both divisible by 3 and divisible by 4 it is divisible by 12.

The number of rotor posts (rotor posts, here, refers to the number of rollers with permanent magnets of alternating polarity relative to adjacent rollers with magnets) is then based on the number of stator posts and, for a concentrated winding, the number of rotor posts is greater than or lesser than the number of stator posts. For example −2 or +2, but −4 or +4 is preferred, because this distributes the magnetic force around the air gap to reduce the bending load on the stator. Other differences will work also.

Here, the number of rotor posts is the number of pinions with magnets in them, which is typically either the number of total pinions or the number of pinions in one of the rows of pinions.

Figure 4:
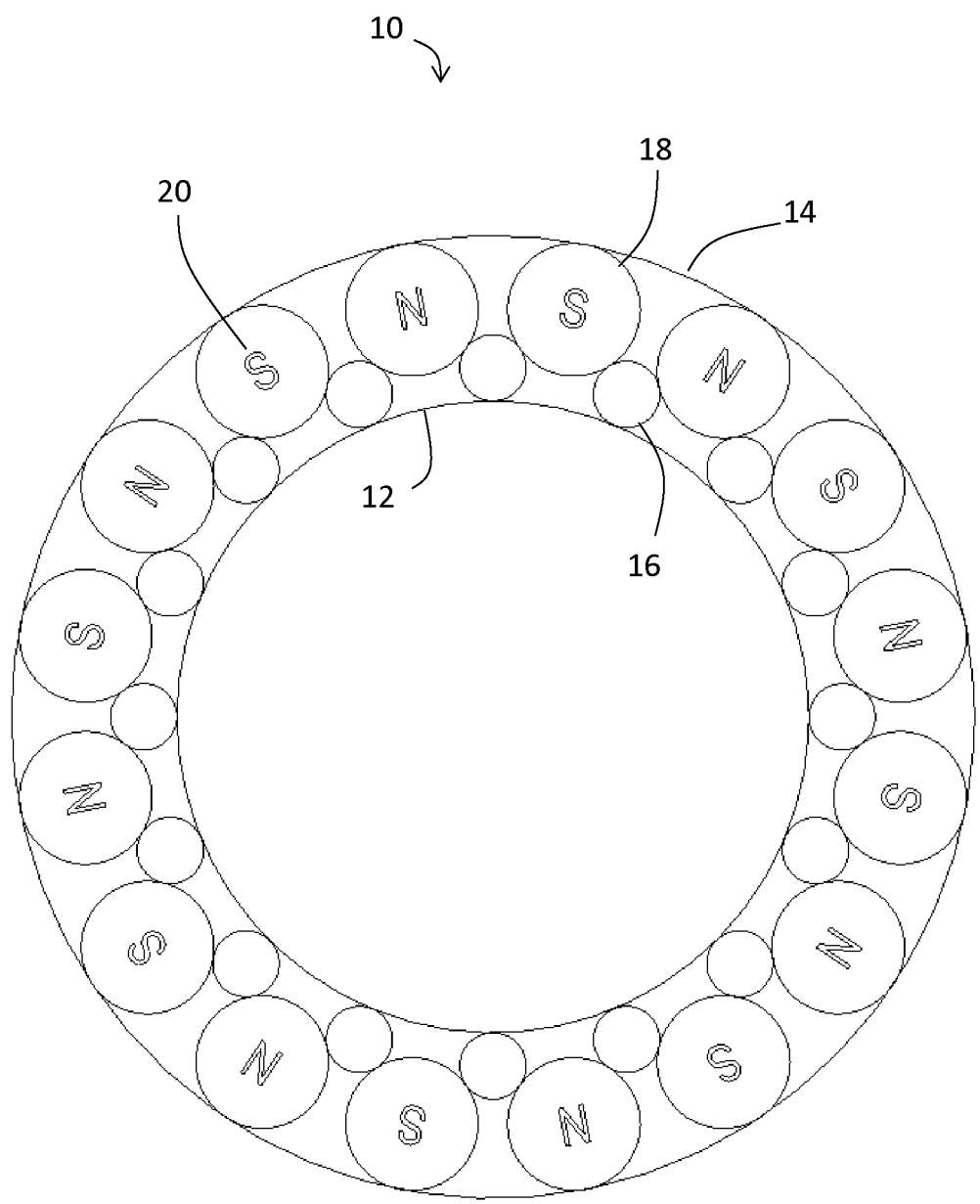
FIG. 4 is a schematic cross section of an exemplary embodiment of a gearbox having larger outer pinions than inner pinions, with 16 pinions per row, and the larger row of pinions having magnets.

An example of a suitable number of pinions in a row, in an embodiment with magnets in one row of pinions, is 16, as shown in FIG. 4.

The embodiments shown in FIGS. 1-5 are referred to here as sunless self-energizing gearboxes. These embodiments are quite simple. They each have only one (typically fixed) inner ring and one outer ring (typically connected to an output). The rollers act as bearings, reducing or eliminating the need for conventional bearings. This is a simple and low-cost actuator for anything that needs a high speed like an exoskeleton. Embodiments disclosed in this application could be used for example in an exoskeleton as disclosed in US patent application publication no. 2017/0181916.

Figure 5:
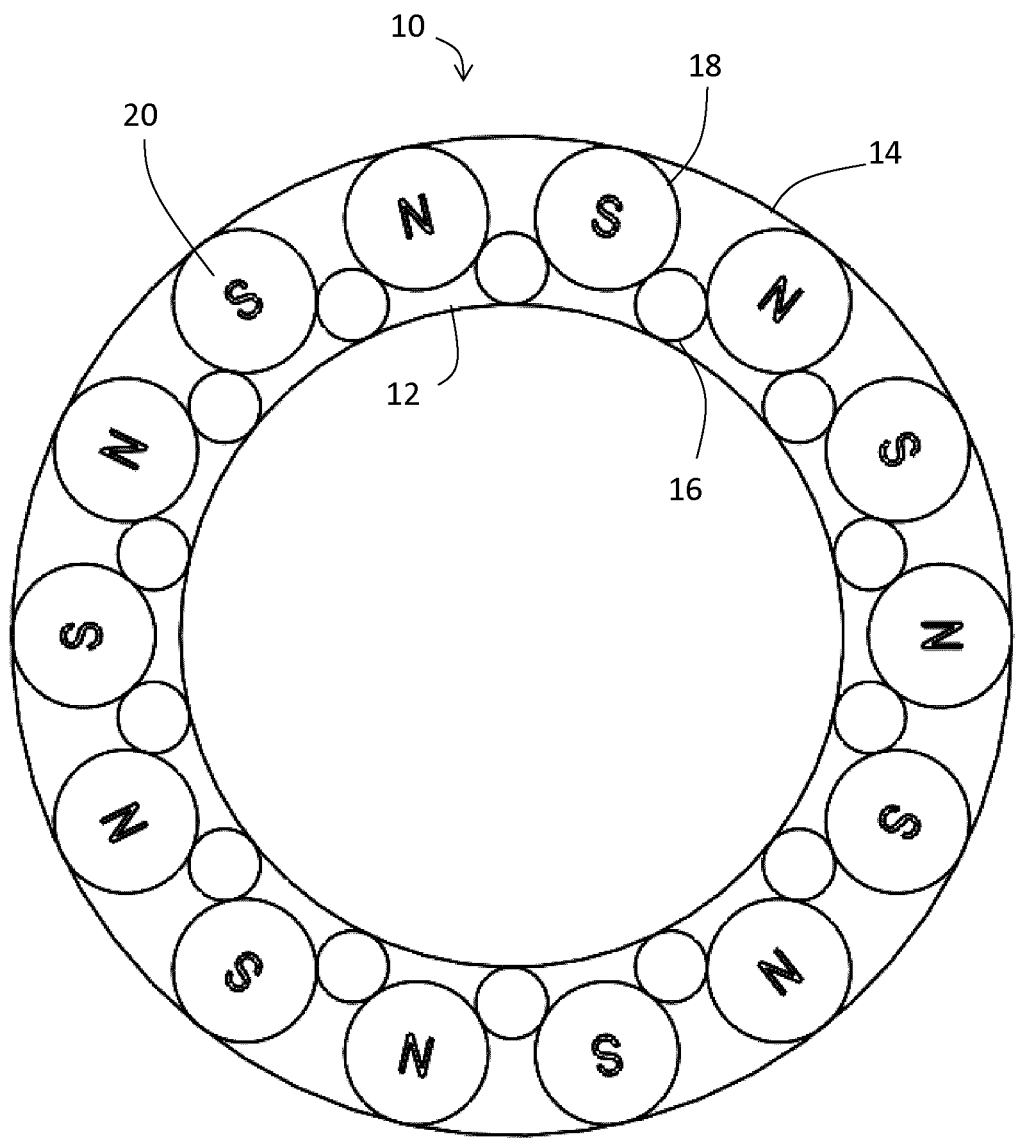
FIG. 5 is a schematic cross section of an exemplary embodiment of a gearbox having larger outer pinions than inner pinions, with 14 pinions per row, and the larger row of pinions having magnets.
Figure 6:
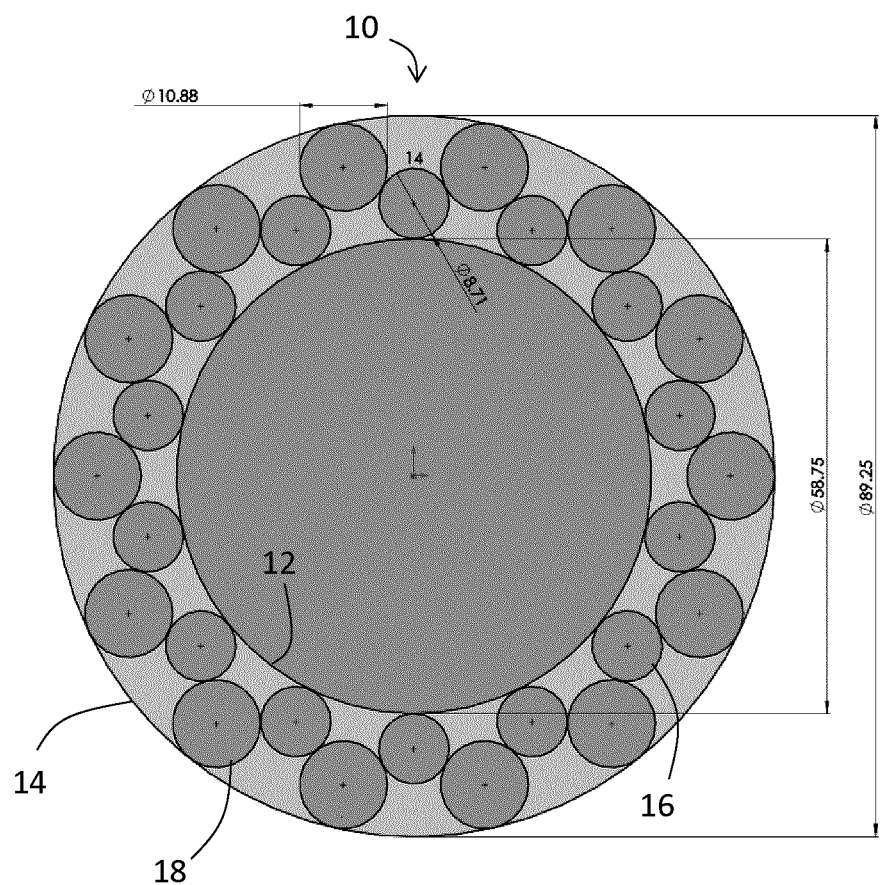
FIG. 6 is a schematic cross section of an exemplary embodiment of a gearbox having larger outer pinions than inner pinions.

FIG. 6 shows an embodiment with 14 pinions per row, with a less extreme difference in pinion sizes than in FIG. 5. No magnets are shown. All of these embodiments can be used with or without magnets. Without magnets, input force can be supplied by an input gear as described and shown below.

Gear or Lobe Configurations

Figure 7:
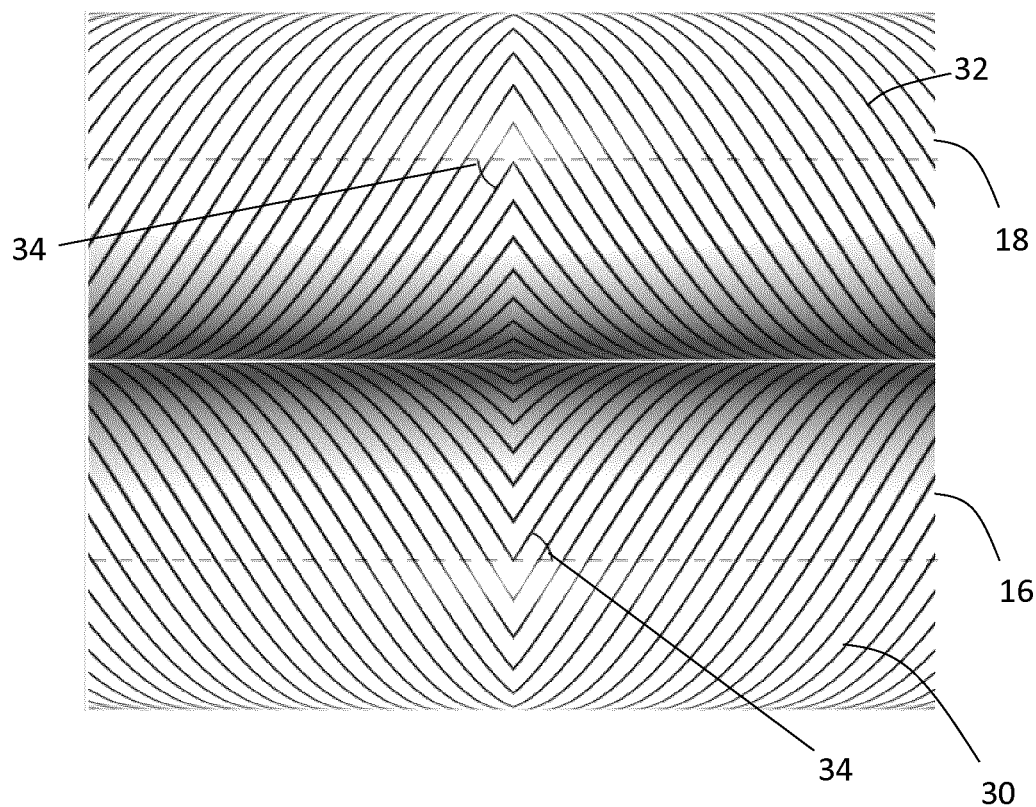
FIG. 7 is a schematic side view of two rollers showing an exemplary gear pattern.

FIG. 7 shows a non-limiting example of inner herringbone gears or lobes 30 on inner roller 16 and outer herringbone gears or lobes 32 on outer roller 18. The gears or lobes 30 and 32 are shown schematically by lines. The gears or lobes 30 and 32 would mesh, though in this figure the gears appear slightly separated. The herringbone gears or lobes help constrain axial positioning of the rollers. The axial positioning may be constrained by any use of gears or lobes that have a different helix angle at different portions of a roller simultaneously in contact with a surface or another roller. The herringbone shape shown in FIG. 7 is only one example of this. To distinguish from the "pressure angle" defined below, the angle referred to in this paragraph, being an angle of the lobe peaks or troughs away from an axial direction, will be referred to as a helix angle. The helix angle 34 (represented by an arc connecting a line showing a lobe 30 to a dotted line parallel to the axis) is opposite on different axial portions of the rollers in this embodiment. This opposite, non-zero angle is an example of different helix angles on different axial portions.

Figure 8:
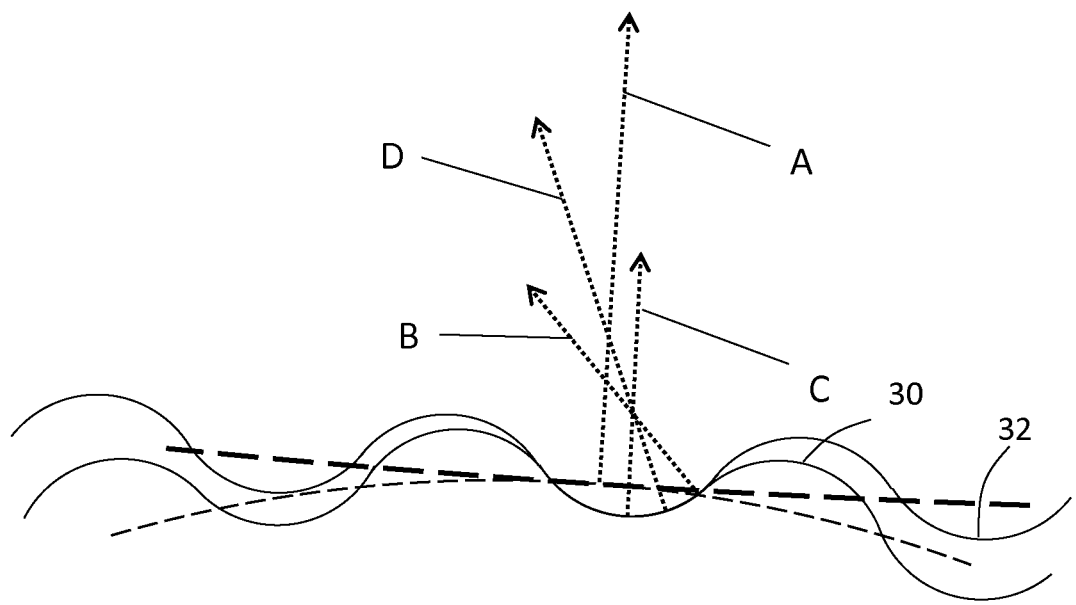
FIG. 8 is a diagram showing a simplified example of a low angle lobe profile.

Although this device could possibly be configured to work with traction surfaces, the use of lobes as for example shown in FIG. 8 will have the effect of increasing the apparent coefficient of friction by preventing sliding at higher angles between the gears. A high effective pressure angle lobe can therefore be used such as a sine wave profile as long as the average maximum pressure angle when under load is low enough to prevent the lobes or gear faces from disengaging.

A simplified example of a high effective pressure angle lobe profile is shown in FIG. 8. A high effective pressure angle lobe geometry is believed to allow a high rolling contact capability by increasing the radially active surface area. The combination of the self-camming effect that increases the radial contact force with increased torque and this low effective pressure angle lobe geometry is expected to result in minimal sliding and therefore low rolling friction.

High effective pressure angle—In a conventional gearbox, a high pressure angle would result in a high separating force between the gears during torque transfer. In embodiments of the device, the lobe pressure angle is low enough to increase the effective friction coefficient of the contact areas so a camming angle is established. Once this critical effective friction coefficient (EFC) is established, the self-energizing effect will cause the rollers to increase the traction pressure rather than to slide or skip. FIG. 8 depicts lobe contact between a roller and race. The dashed curves represent the pitch diameter of a roller on the bottom and a larger diameter race on top. The long dashed line A represents the actual contact angle if it were a non-geared interface and is in the radial direction relative to the axis of the roller. Line B represents the maximum pressure angle during the lobe mesh as the roller rolls on the race and is normal to the surface of the lobe. Line C represents the minimum pressure angle during the load mesh as the roller rolls on the race and is normal to the surface of the lobe. During torque transfer, the contact pressure is biased in one direction so there is no effective contact in the opposite direction of contact line B. As a result of this contact pattern, the average effective pressure angle is along line D, approximately halfway between lines B and C.

As described in WO2013173928A1 (the content of which is incorporated by reference herein), each of the inner race and outer race may be circular and centered on an axis. A traction angle $ø_t$ may be defined as follows: for each pair of a first inner roller that contacts a first outer roller, the traction angle $ø_t$ is defined as the angle between a first line extending outward from the axis through a center of the first inner roller and a second line extending from the contact point of the first outer roller with the outer race and a contact point of the first inner roller with the inner race. Orbital motion the rollers leads to differential motion between the inner race and outer race, and thus torque forces are transmitted between the inner and outer races via the rollers. The torque forces are transmitted between the contact points of adjacent rollers and thus are transmitted at the traction angle having a ratio of a circumferential component to a radial component equal to the tangent of the traction angle. Thus, as described in WO2013173928A1, for traction surfaces if a coefficient of friction between the inner race and inner roller is greater than the tangent of the angle, the torque will generate a radial component sufficient to maintain traction as the torque increases, without requiring a large preload or any additional mechanism to increase radial loading. This is referred to herein as the "camming effect"; a device exhibiting this camming effect may also be referred to herein as "self energizing".

With gears or lobes on the rollers, the coefficient of friction is not relied on to create a self-energizing effect to keep the rollers from rotationally sliding on each other. Instead, the gears or lobes serve to time the rollers to each other and to their respective races.

In an embodiment shown in FIG. 7, the lobes cover substantially a full radial surface of the rollers, and the inner roller lobes mesh with both outer roller lobes and inner race lobes, and the outer roller lobes mesh with both inner roller lobes and outer race lobes. However, it is also possible to have lobes only on a portion of the rollers. Also, it is possible to have a different portion of the rollers, and thus possibly different lobes, in contact with the corresponding race than with the adjacent rollers. One could also have different selections of lobes, gears, or traction surfaces for the different contacts.

Gear Tooth Profile

Embodiments of the present device use a geared contact between the two rows of planets and between planets and races. This geared contact allows a larger camming angle and potentially higher torque transmission. One challenge to be solved with a geared contact is that the radial compression between geared components can result in non-conjugate motion, and high friction and cogging as a result of the wedging effect of teeth of one planet acting as wedges that are being forced between the receiving teeth of the meshing planet. This wedging effect results in a high mechanical advantage of the radial force between the pinions planar to the gear contact faces resulting in high friction and wear. Forcing gears together radially will also result in a variable friction force as the mechanical advantage changes throughout different phases of the gear tooth contact during pinion rotation. This variable friction force can result in cogging and irregular wear.

A new gear tooth profile for the device provides a combination of rolling contact at a coefficient of traction, combined with an involute gear tooth profile that provides the rest of the torque transfer not provided by the rolling contact.

The use of a cylindrical rolling contact surface between the gear teeth, as described here, and if used with spur gears, will reduce the amount of geared contact (IE: it will reduce the contact ratio). At a high enough percentage of cylindrical rolling contact, a geared contact ratio of less than 1 will occur. Up to this ratio, it is difficult or impossible to achieve a rolling contact ratio of greater than 1. The use of a helical tooth pattern as described here, can provide a continuous rolling contact between gears as well as a continuous geared contact for smooth rolling contact and uninterrupted geared torque transmission. Helical teeth having helical direction at different axial portions of rollers can form herringbone teeth.

Figure 9:
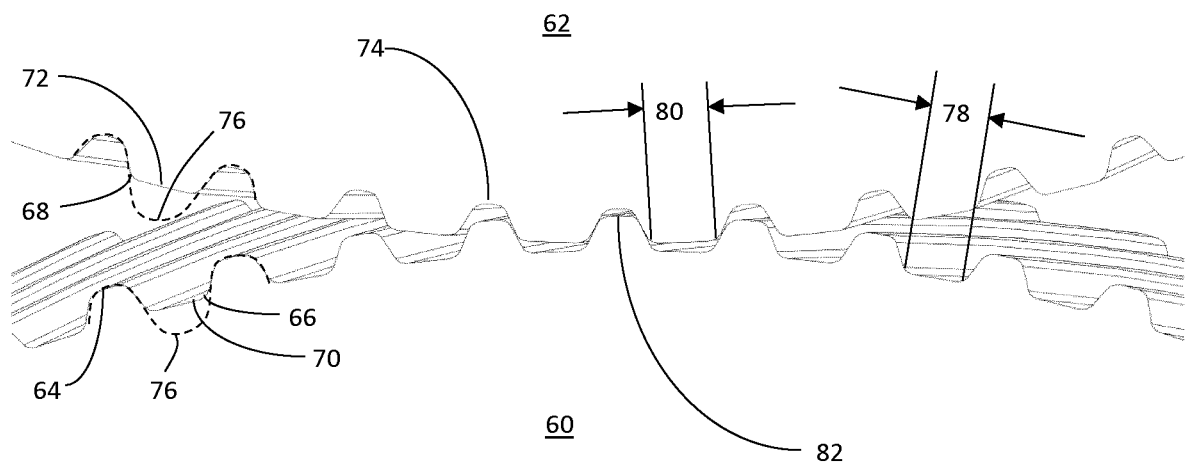
FIG. 9 is a cross section view of meshing planet gears.

In an embodiment, shown in FIG. 9, a helical gear 60 with a exemplary modified involute shape is used for the inner row of planets. Inner planet gear 60 meshes with outer planet gear 62. The OD of the inner planet gear teeth 64 is not necessarily modified, but to provide rolling contact with the outer row of planets, the root 66 of the inner planet teeth is created larger than usual as a cylindrical surface 70 to provide a cylindrical rolling contact with the tips of the outer planet teeth 68. The root 74 of the outer planet teeth are not modified, but the OD of the outer planet teeth 68 are created with shortened tips compared to a conventional gear tooth profile 76 and the tips have a cylindrical surface 72 which meshes in rolling contact with the root 66 of the inner planets. In this way, when combined with a helical gear tooth profile, rolling contact can be maintained at all times between the unusually large cylindrical surface area 70 and the unusually large cylindrical surface area 72, and a geared contact can also be maintained at all times. In an optimized configuration of this gear tooth profile, the involute shape of the gear faces will be tailored to provide conjugate gear motion with the rolling contact diameter being used as the pitch diameter of both gears. Note that with this gear tooth geometry, the cylindrical distance of area 78 corresponding to flat-bottomed roots of one gear will be approximately equal to the cylindrical distance of the area 80 corresponding to flat-topped tips of the other gear. This angular distance can be increased by decreasing the angular size of the teeth as shown by narrow teeth 84 in FIG. 10.

Figure 10:
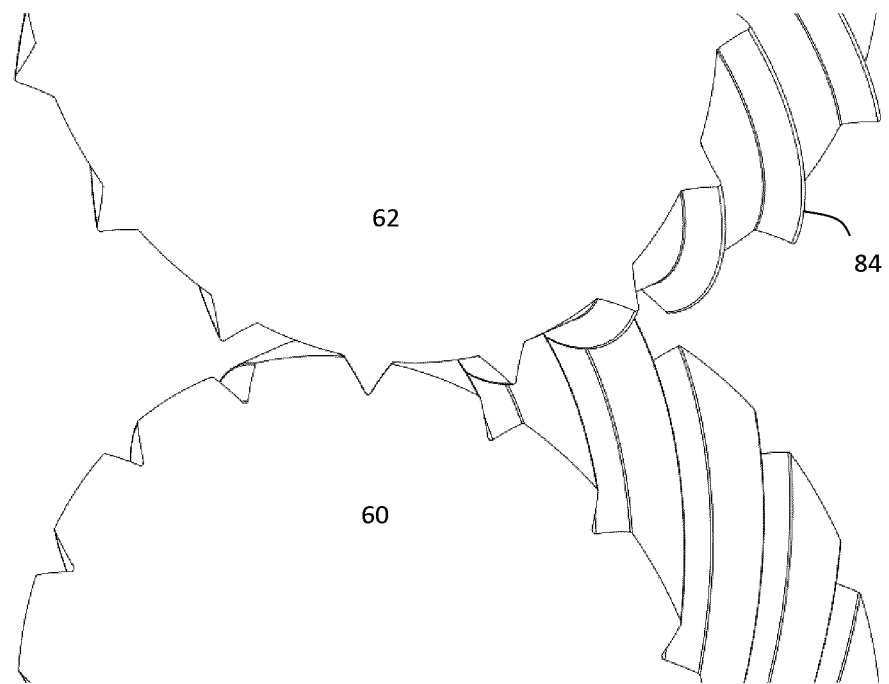
FIG. 10 is a cross section view of another embodiment of meshing planet gears.

The same rolling/geared contact principle applies to the outer planet mesh with the outer ring gear (not shown in FIGS. 9 and 10). In this case the root of the outer ring gear teeth is cylindrical and has a reduced ID compared to a conventional gear. This cylindrical root of the outer gear rolls on the cylindrical OD of the shortened outer planet gear teeth.

The inner fixed ring gear teeth mesh with the inner planet gears by virtue of the root of the ring gear teeth being relatively unmodified and the cylindrical ID of the inner fixed ring gear being reduced to increase the surface area of this cylindrical surface.

In this way (or by way of other variations) material is added to the root of a first meshing gear in a meshing set thereby increasing the material in the root in a cylindrical surface for rolling contact while material is removed from the tooth tips of the second meshing gear teeth so the roots of the teeth on the first gear roll on the tips of the teeth of the second gear. Clearance is then created between the tips of the first gear and the roots of the second gear (as shown at 82 in FIG. 9) so the relative motion of these tips and roots which are not coaxial with the pitch diameters of the gears, does not increase the friction of the gear mesh.

For many applications, such as many robotic applications, some backlash is tolerated in the circumferential direction of the gear mesh because the traction between the cylindrical rolling surfaces will reduce the feeling of backlash during direction changes. This results in a smooth transfer of torque with low friction with the reduced-size gear teeth providing timing and axial location of the gear teeth. The camming action of the present device allows smaller gear teeth to be used for torque transmission because a portion of the torque is transferred through the traction of the rolling contacts.

Lobed Gears

Reasonable performance has been shown with a relatively simple gear tooth profile that uses a sine wave shape gear form. This shape can be a pure sine wave or an approximate sine wave such as a series of linked arcs which form lobes. With a high enough number of lobes, the height of the teeth is short enough to reduce the sliding motion between the gear teeth while providing enough surface area at the tips and roots of the lobes in the radial direction for smooth rolling contact. For example, the lobe height may be less than ¹⁄₂₀, ¹⁄₃₀ or ¹⁄₄₀ of a radius of a gear, for example an inner roller gear or outer roller gear. The use of a high helix angle provides a consistent radial contact and consistent torque transmission surface area in the tangential direction. When this lobed shape is used with the self camming geometry of the present device, the traction angle will determine how much of the torque transmission is provided by the tangential contact and how much is provided via traction of the tooth roots in semi-rolling contact with the tooth tips.

Torque Transmission

Figure 11:
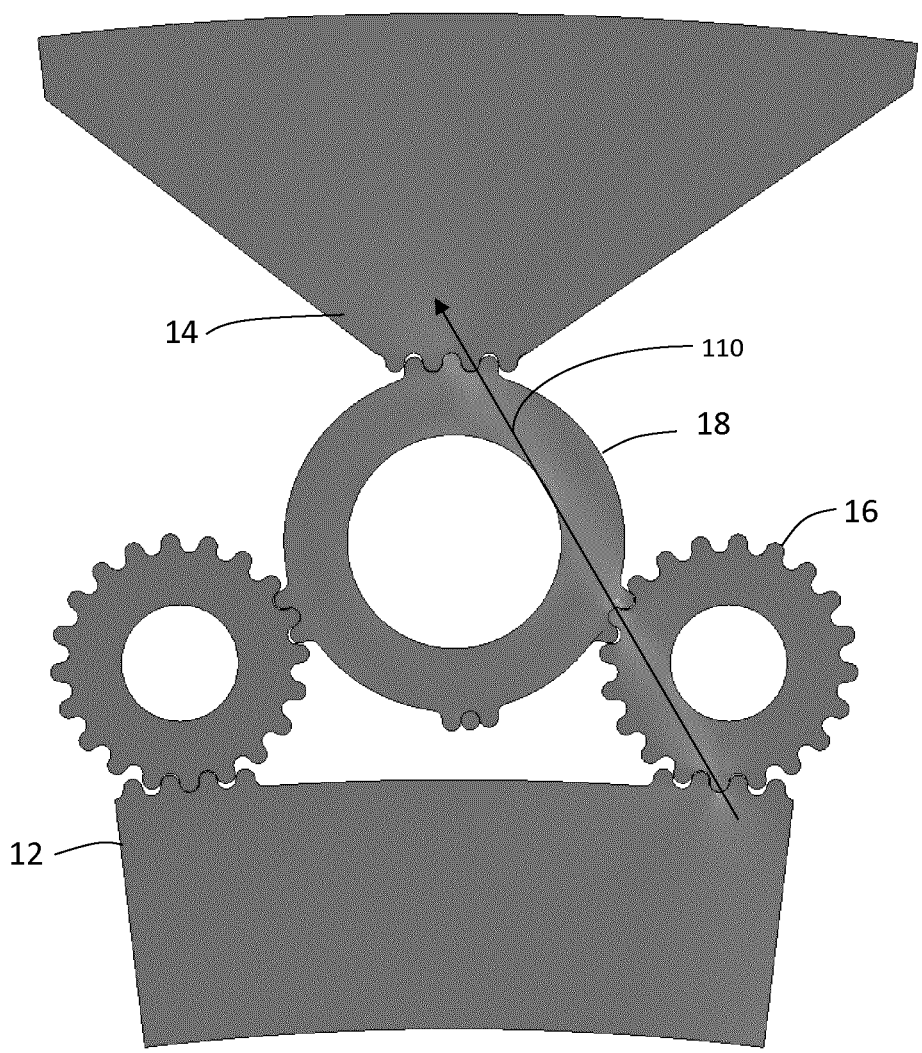
FIG. 11 is a schematic cross section of an exemplary gearbox with hollow rollers showing a path between an inner ring and an outer ring.

Embodiment of the device display very rigid torque transmission, even when constructed from plastic. The rotational stiffness potential of embodiments of the device are believed to be much higher than is possible form a conventional planetary gear train. This is because the torque is transferred from the inner gear to the outer gear through an array of nearly straight line though the inner and outer gears. This straight line torque transfer is shown in a simplified FEA analysis in FIG. 11. An arrow is added to mark the line of stress 110 which is shown as lighter shading in FIG. 11.

Increased radial preload may increase stiffness, but it will also increase rolling friction. Increased rolling friction is not always beneficial, but there are cases where it is helpful. In machining, for example, it is desirable to prevent backdriving of the gearbox as a result of tool load or vibration. In other uses, like applications where a safety brake is needed, high preload can be used to make the gearbox non-backdriveable below a certain backdrive torque. This reduces the cost and complexity and power consumption of a brake which must be disengaged with an electric current, for example.

Embodiment with Input Ring

In one example, a self-energizing portion of a gearbox consists of a stationary inner sun gear meshes with 17 equally spaced inner planets, which in turn mesh with 17 equally spaced outer planets. The outer planets then mesh with the outer ring. The input of this stage is the orbit of the planets, while the output is the motion of the outer ring. The input stage drives the planets in the self-energizing stage by using a planetary gear. This stage uses the sun as an input, the planet rotation as the output, and an idler outer ring. A 45° helical profile is used in a herringbone configuration for each of the gears.

The diameters and number of gear teeth used in this embodiment are shown in Table 1.

TABLE 1

| | Diameter | # of Teeth |
|---|---|---|
| Sun | 105.4 | 170 |
| Inner Planet | 19.85 | 32 |
| Outer Planet | 12.40 | 20 |
| Outer Ring | 158.10 | 255 |
| Input Sun | 124.89 | 102 |
| Input Planet | 20.81 | 17 |
| Idler Ring | 166.51 | 136 |

Traction and geared configs of embodiments of the device are described in published patent application no. WO2013173928A1. This disclosure includes configurations using geared input and gear tooth profiles and configurations to provides benefits which include effective ways to keep planets equally spaced (circumferentially and axially), way/s of minimizing part count through a non-symmetric input, and a simplified way of increasing reduction ratio though a non-symmetric sun ring input to the inner or outer planet arrays.

Figure 12:
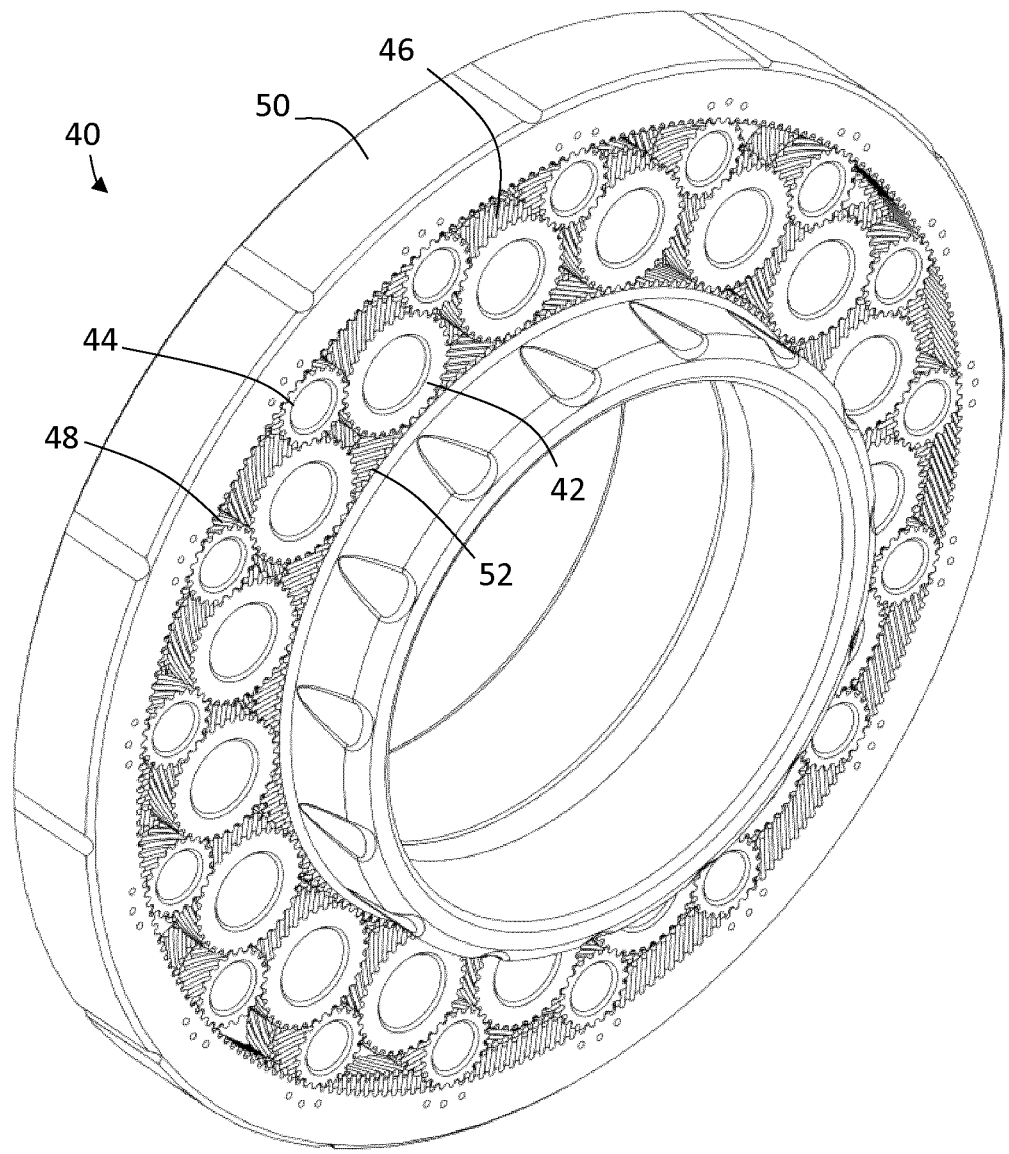
FIG. 12 is a front isometric view of an embodiment of a gearbox.
Figure 13:
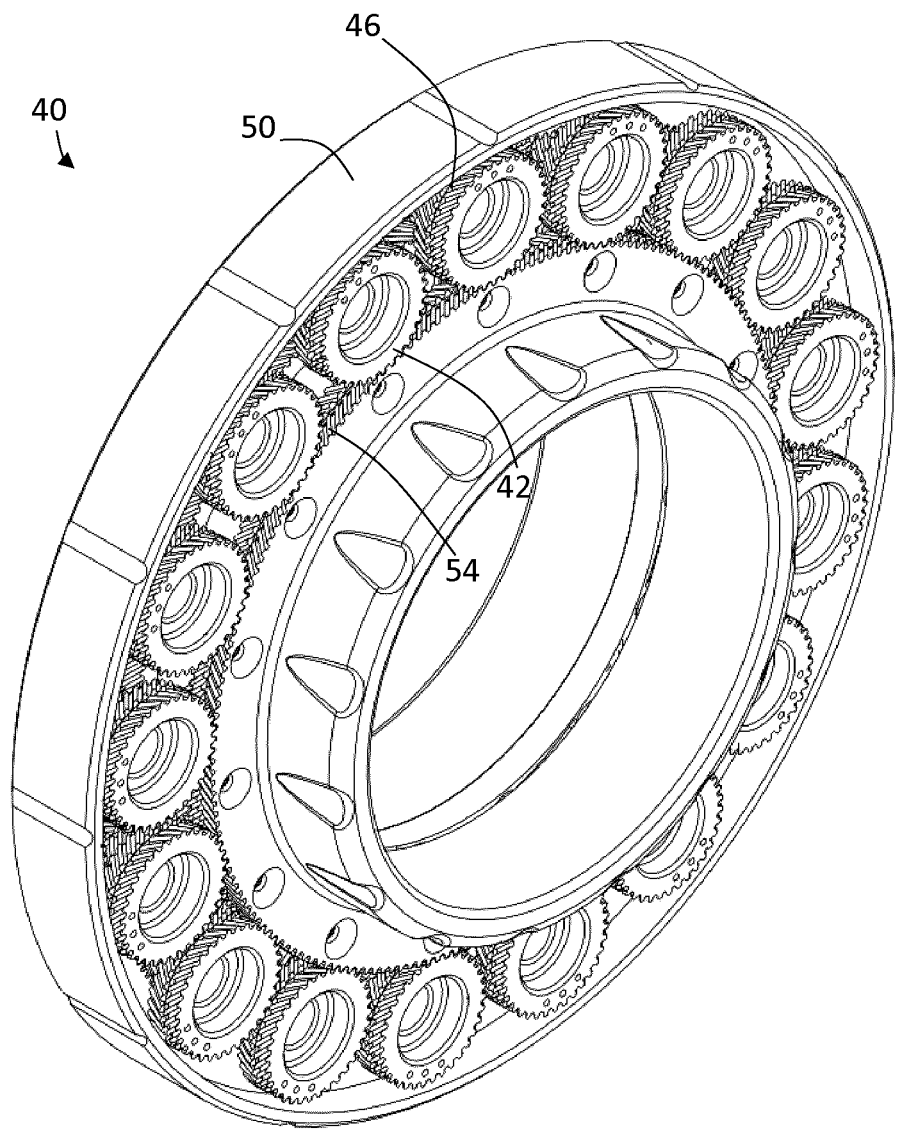
FIG. 13 is a rear isometric view of the gearbox of FIG. 12.

FIGS. 12 and 13 show respectively front and rear isometric views of an embodiment of a gearbox 40. As can be seen, there are inner gears 42 and outer gears 44 with herringbone shaped gear teeth 46 on the inner gears 42 and meshing herringbone shaped gear teeth 48 on the outer gears. Only the inner gears 42 extend to the rear of the gearbox in this embodiment. An outer race 50 drives the planetary gears, the inner gears 42 contacting different sized inner races 52 and 54 to drive one inner race 52 with respect to the other inner race 54.

Axially Outward Sun Gear Input

The use of geared contact between the planets and ring gears keeps them equally spaced circumferentially. The use of herringbone gear or lobe teeth prevents movement of the gears in the axial direction. This allows the gears to be used as a bearing for relative location of the inner fixed gear and the outer output gear in both the radial direction and the axial (thrust bearing) direction. This is an advantage for reducing complexity and cost.

Another benefit of this combination of herringbone gears or lobes is to improve the ability to drive the inner or outer planets from only one side of the gearbox without them twisting about a radial axis of the gearbox. By using a gear 90 in FIG. 14 which is fixed to the outer planet 92 (as shown here in this partial assembly sketch) or to an inner roller 94 of the same or different pitch diameter as the roller it is fixed to, the reduction (or speed increasing if in reverse) ratio can be increased through the use of a sun gear 96 input. This one-sided drive is also beneficial for assembly because it allows the use of a single gear array instead of two or more arrays aligned helically. These helical gears must be threaded together during assembly, so having only one set of planets in the axial direction allows the inner fixed ring gear and/or the outer output gear to be manufactured in two pieces and threaded together from both axial ends.

In an example of how a non-limiting exemplary embodiment of the device can be assembled, the following describes one way the device can be assembled if the geometry is created according to the principles described here.

Assembly

Figure 14:
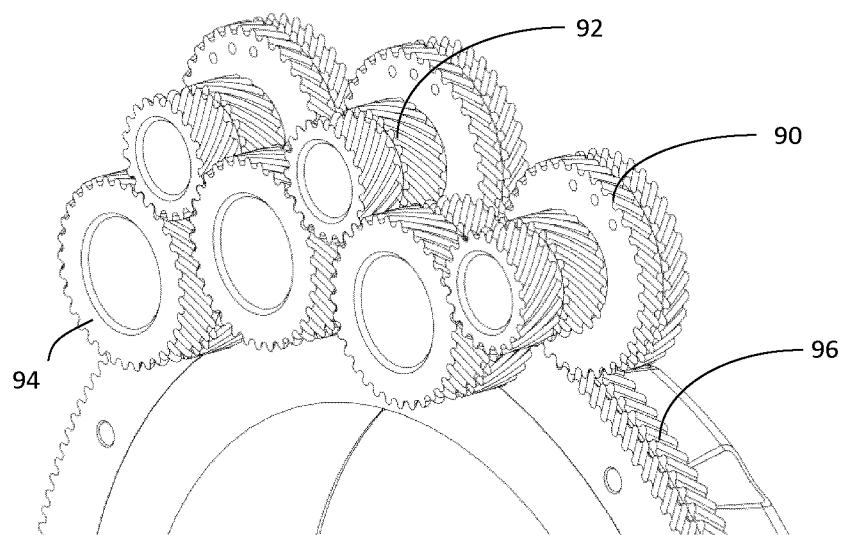
FIG. 14 is an isometric cutaway view of a gearbox with an asymmetric sun input.
Figure 15:
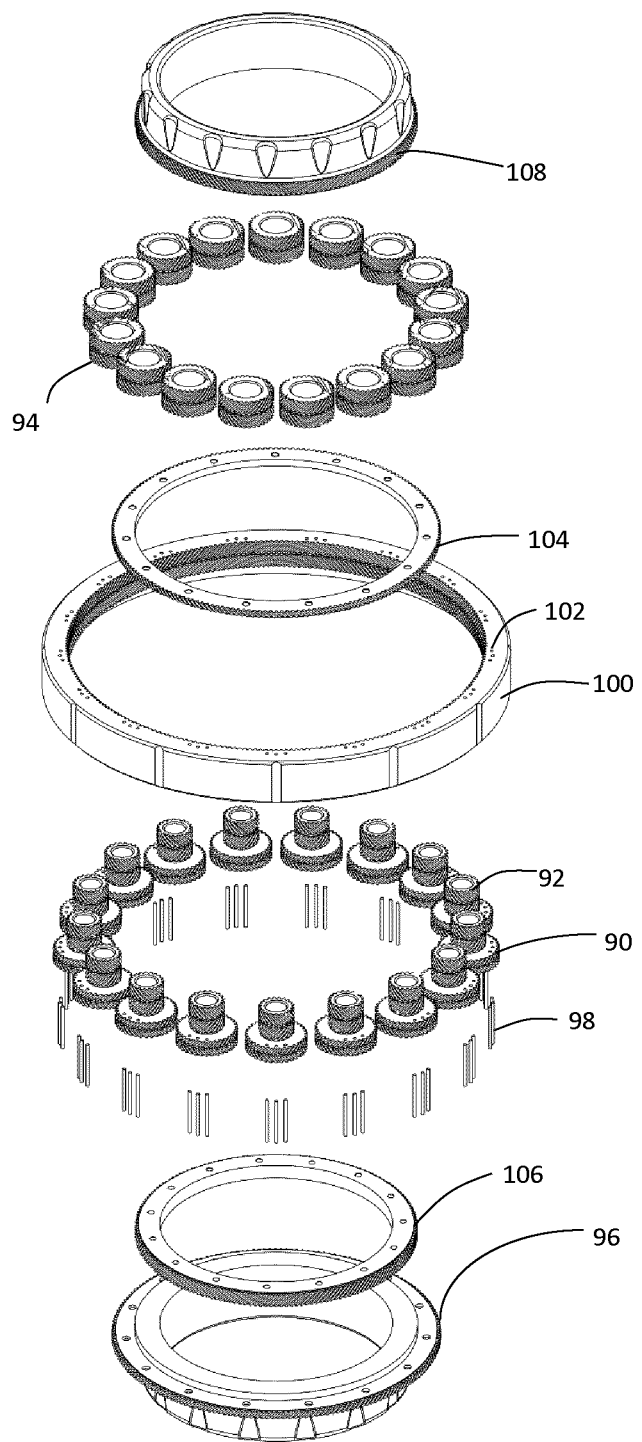
FIG. 15 is an exploded view of the gearbox of FIG. 14.
Figure 16:
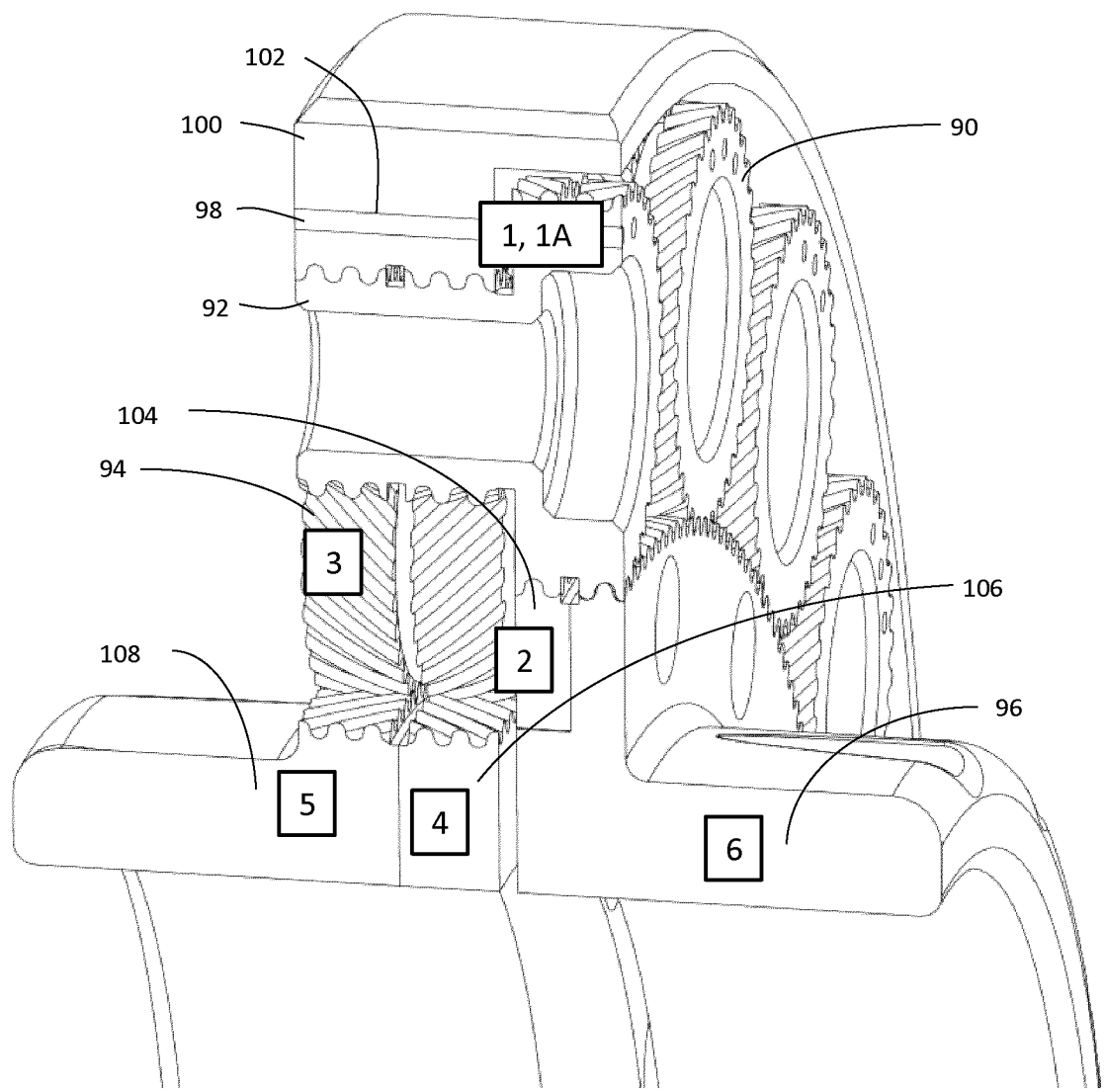
FIG. 16 is a cutaway view of the gearbox of FIG. 14 showing exemplary assembly steps.

FIG. 15 is an exploded view and FIG. 16 a cutaway view of the device of FIG. 14. The parts indicated in FIG. 14 are also present in FIG. 15. In addition, there are pins 98 for temporary alignment of the outer planets; an outer output gear 100 having holes 102 for receiving the pins; an input sun ring 104 that combines with the input sun gear 96, and a stationary sun ring 106 that combines with a stationary sun gear 108.

Order of assembly is as follows, and indicated by boxes with step numbers in FIG. 16. In step 1, the outer planets 92 are inserted into the outer output gear 100. As they are the first components to be installed there is room to put them in via a radial motion so the outer output gear and outer planets can be made as one piece despite the herringbone meshing. In step 1A, pins 98 are inserted through holes in the outer planets 92 and holes 102 in the outer output gear 100. These pins are for temporary alignment and may be removed when no longer needed. In step 2, input sun ring 104 is inserted and meshes with first halves of the gears 90 fixed to the outer planet gears 92. In step 3, the inner planets 94 are installed. They also can be inserted radially. In step 4, the stationary sun ring 106 is installed and meshes with portions of the inner planet gears 94. In step 5, the stationary sun gear 108 is inserted and meshes with other portions of the inner planet gears 94. The stationary sun ring 106 and stationary sun gear 108 may be fixed together. In step 6, the input sun gear 96 is inserted and may be fixed to the input sun ring 104.

To operate this non-limiting demonstration exemplary embodiment, turning sun and holding inner ring will cause outer ring to spin at a reduced ratio of approximately 7:1.

If the outer planets are driven by the sun gear, as shown here, input by a larger gear than the outer pinion diameter as shown here, it is preferable to have the smallest dimension of the larger sun input ring gear larger than the OD of the fixed ring gears. In this way, assembly of the gearbox is enabled because the two halves of the inner fixed ring (4,5) can be "threaded" together from either side of the inner row of pinions after the inner sun gear ring member (2) is threaded onto the larger sun input pinion gears from the inner plane outward as described above. Furthermore, if the OD of the inner fixed ring is smaller than one half of the sun input ring, the sun input ring gear assembly can be a herringbone profile so it requires no bearing. The inner half of the sun input ring can be "threaded" into engagement with the sun gear input pinion gears from the inside of the assembly before the yellow inner pinions are inserted, and then the other half of the sun gear herringbone can be threaded on from the outside bolted to the first half of the sun gear after the inner (yellow) row of pinions has been inserted and the two halves of the inner fixed gear herringbone has been assembled from both axial ends.

Gear Combinations

While there are many potential benefits of this device, at this point it has been shown by the inventors that there are no known gear combinations that provide a perfect gear mesh.

So far, over 100 million combinations of planet numbers and gear tooth numbers on planets and gear rings has been tested with no perfect solutions possible. This has required that the possibilities be narrowed down to the least imperfect possibilities.

The constraints for selecting a usable combination include the following:

Diameter differential of the sun and outer ring large enough to provide a reduction ratio between the inner fixed ring and outer output ring of greater than 2:1 (2 orbits of the planet results in 1 or more rotations of the output ring). Planet numbers range from min of 5 to max of 30, although there are additional solutions beyond this range of planets.

A gear tooth pitch of greater than 0.7 mm (this is to allow manufacturing by common gear production methods including injection molding).

Outer ring OD of approximately 89.25 mm was set as constant, knowing that the gear diameters can be scaled to larger or smaller diameters as required. By the application. This diameter was selected as one that is of useful size for the robotics market.

Only non-perfect solutions have been found. The imperfection in the gear combinations shows up as either an imperfect alignment of the gear teeth or a mismatch in the module of the meshing gears. Typically, the inner row of planets will mesh well with the inner fixed gear, and the outer row of planets will mesh well with the outer output ring gear, but the inner planet teeth will be misaligned to the outer planet row gears. Some misalignment can be tolerated due to the compliance of the materials but the greater the misalignment, the lower the torque transmission capacity of the gearbox and the greater the friction due to interference between the gears.

The use of more, smaller teeth increases the number of potential options, but small gear teeth make manufacturing and assembly more difficult and small teeth may also reduce torque transmission in some cases.

The use of fewer planets increases the manufacturability of the planets, but more planets allows for a larger maximum torque assuming the load is shared between planets and provides additional solutions.

With all of these considerations taken into account, the number of usable combinations is surprisingly low. An inaccuracy index was used to compare the different options with the index indicating how misaligned the planet-to-planet mesh is for a given option.

The potentially usable configurations have been limited to those solutions with an RMS error factor of less than 0.0004 and are shown in the following table. Error factors higher than shown will be appropriate for certain applications. In addition, the shown configurations may be scaled geometrically while keeping the number of teeth constant.

The error factor shown in table 2 below accounts for both angular error and diameter errors. The ratio given assumes that the input is the rotation of the input sun, with the inner ring held stationary and the outer ring as the output.

TABLE 2

| | Diameter (mm) | | | | | # Teeth | | |
| --- | --- | --- | --- | --- | --- | --- | --- | --- |
| # Planets | Outer Ring | Oputer Planet | Input Sun | Inner Planet | Inner Ring | Outer Ring | Oputer Planet | Input Sun |
| 10 | 89.250 | 13.845 | 61.560 | 14.083 | 42.236 | 361 | 56 | 249 |
| 10 | 89.250 | 13.425 | 62.400 | 14.658 | 41.975 | 359 | 54 | 251 |
| 16 | 89.250 | 10.282 | 68.685 | 5.336 | 69.544 | 217 | 25 | 167 |
| 11 | 89.250 | 13.328 | 62.594 | 9.526 | 55.270 | 375 | 56 | 263 |
| 7 | 89.250 | 23.100 | 43.050 | 11.557 | 28.617 | 340 | 88 | 164 |
| 12 | 89.250 | 5.667 | 77.917 | 18.193 | 52.478 | 378 | 24 | 330 |
| 10 | 89.250 | 13.000 | 63.250 | 15.240 | 41.711 | 357 | 52 | 253 |
| 7 | 89.250 | 22.709 | 43.833 | 12.154 | 28.257 | 338 | 86 | 166 |
| 11 | 89.250 | 12.921 | 63.408 | 10.056 | 55.087 | 373 | 54 | 265 |
| 7 | 89.250 | 22.905 | 43.440 | 11.855 | 28.438 | 339 | 87 | 165 |
| 5 | 89.250 | 20.146 | 48.959 | 21.566 | 24.855 | 381 | 86 | 209 |
| 16 | 89.250 | 10.644 | 67.961 | 4.903 | 69.629 | 218 | 26 | 166 |
| 6 | 89.250 | 19.461 | 50.329 | 15.434 | 45.005 | 399 | 87 | 225 |
| 6 | 89.250 | 19.109 | 51.032 | 15.962 | 44.782 | 397 | 85 | 227 |
| 6 | 89.250 | 18.754 | 51.742 | 16.494 | 44.557 | 395 | 83 | 229 |
| 10 | 89.250 | 14.053 | 61.144 | 13.798 | 42.366 | 362 | 57 | 248 |
| 10 | 89.250 | 13.213 | 62.824 | 14.949 | 41.844 | 358 | 53 | 252 |
| 6 | 89.250 | 18.395 | 52.460 | 17.032 | 44.330 | 393 | 81 | 231 |
| 6 | 89.250 | 18.033 | 53.185 | 17.576 | 44.100 | 391 | 79 | 233 |
| 6 | 89.250 | 19.285 | 50.680 | 15.910 | 40.815 | 398 | 86 | 226 |
| 6 | 89.250 | 17.666 | 53.917 | 18.125 | 43.868 | 389 | 77 | 235 |
| 5 | 89.250 | 25.665 | 37.920 | 13.632 | 25.665 | 386 | 111 | 164 |
| 24 | 89.250 | 5.067 | 79.117 | 7.393 | 70.197 | 229 | 13 | 203 |
| 21 | 89.250 | 9.211 | 70.828 | 9.215 | 55.897 | 281 | 29 | 223 |
| 7 | 89.250 | 23.294 | 42.662 | 11.261 | 28.795 | 341 | 89 | 163 |

| | # Teeth | | | | | | Ratio (Outer Ring Output) | Ratio (Sun Output) |
| --- | --- | --- | --- | --- | --- | --- | --- | --- |
| # Planets | Inner Planet | Inner Ring | Error Sum | RMS Error | Phases | Tooth Width | | |
| 10 | 57 | 171 | 0.0008 | 0.0003 | 10 | 0.8 | 3.2 | 2.2 |
| 10 | 59 | 169 | 0.0008 | 0.0003 | 10 | 0.8 | 3.2 | 2.2 |
| 16 | 13 | 169 | 0.0088 | 0.0025 | 16 | 1.3 | 9.1 | 8.1 |
| 11 | 40 | 232 | 0.0010 | 0.0003 | 11 | 0.7 | 4.9 | 3.9 |
| 7 | 44 | 109 | 0.0010 | 0.0003 | 7 | 0.8 | 2.5 | 1.5 |
| 12 | 77 | 222 | 0.0010 | 0.0003 | 2 | 0.7 | 4.1 | 3.1 |
| 10 | 61 | 167 | 0.0011 | 0.0003 | 10 | 0.8 | 3.1 | 2.1 |
| 7 | 46 | 107 | 0.0010 | 0.0003 | 7 | 0.8 | 2.4 | 1.4 |
| 11 | 42 | 230 | 0.0011 | 0.0003 | 11 | 0.8 | 4.9 | 3.9 |
| 7 | 45 | 108 | 0.0012 | 0.0003 | 7 | 0.8 | 2.4 | 1.4 |
| 5 | 92 | 106 | 0.0011 | 0.0003 | 5 | 0.7 | 2.1 | 1.1 |
| 16 | 12 | 170 | 0.0081 | 0.0023 | 8 | 1.3 | 9.2 | 8.2 |
| 6 | 69 | 201 | 0.0007 | 0.0003 | 2 | 0.7 | 3.8 | 2.8 |
| 6 | 71 | 199 | 0.0007 | 0.0004 | 6 | 0.7 | 3.8 | 2.8 |
| 6 | 73 | 197 | 0.0007 | 0.0004 | 6 | 0.7 | 3.7 | 2.7 |
| 10 | 56 | 172 | 0.0012 | 0.0004 | 5 | 0.8 | 3.2 | 2.2 |
| 10 | 60 | 168 | 0.0012 | 0.0004 | 5 | 0.8 | 3.1 | 2.1 |
| 6 | 75 | 195 | 0.0007 | 0.0004 | 2 | 0.7 | 3.7 | 2.7 |
| 6 | 77 | 193 | 0.0007 | 0.0004 | 6 | 0.7 | 3.6 | 2.6 |
| 6 | 71 | 182 | 0.0012 | 0.0004 | 3 | 0.7 | 3.3 | 2.3 |
| 6 | 79 | 191 | 0.0008 | 0.0004 | 6 | 0.7 | 3.6 | 2.6 |
| 5 | 59 | 111 | 0.0013 | 0.0004 | 5 | 0.7 | 2.4 | 1.4 |
| 24 | 19 | 181 | 0.0067 | 0.0023 | 24 | 1.2 | 9.0 | 8.0 |
| 21 | 29 | 176 | 0.0012 | 0.0004 | 21 | 1.0 | 4.8 | 3.8 |
| 7 | 43 | 110 | 0.0013 | 0.0004 | 7 | 0.8 | 2.5 | 1.5 |

Selecting for gear/lobe teeth of at least 1 mm (for 3D printing) and minimizing the error factor, a discovery analysis according to the algorithm produced only hundreds of positive options after iteratively examining several hundred million possibilities.

Other less ideal options are shown.

Included in the gear combinations are gears that are both in phase and out of phase. Including out of phase gears significantly increases the number of solutions when compared to only in phase solutions. Additionally, the error factor tends to be lower in out of phase solutions.

Figure 17:
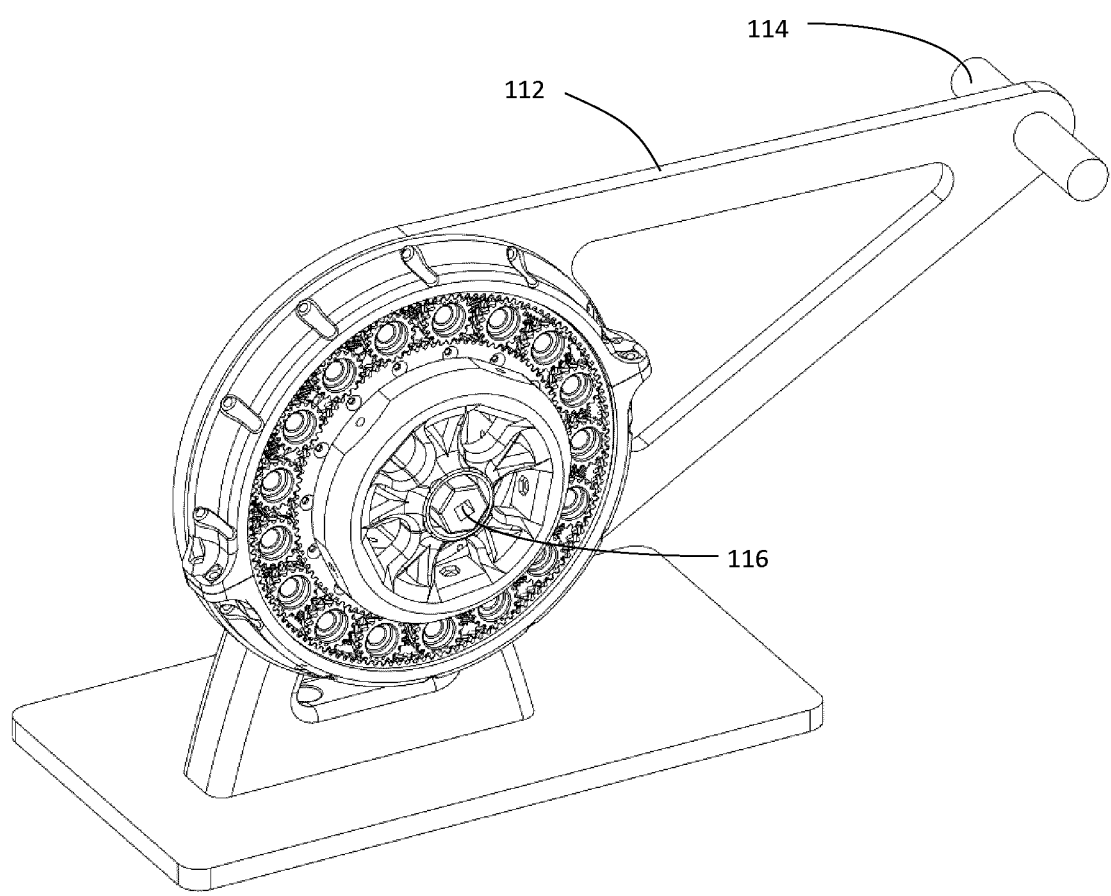
FIG. 17 is an isometric view of a testing system for a gearbox.

Test Stand:

Separate components were designed and 3D printed to be fixed to the stationary and input components of the gearbox in order to test output torque capabilities. FIG. 17 shows a torque testing setup used to connect a mass on a lever arm to the gearbox and measure the required torque to lift the mass. As shown in FIG. 17, a 1 ft lever arm 112 was connected to the output outer ring to load the output of the gearbox and the output torque was calculated as the mass (not shown) attached to attachment point 114 multiplied by the length of the arm. A wrench (not shown) was attached to the input 116 of the arm for torque transfer through the device.

Idler Ring

Figure 18:
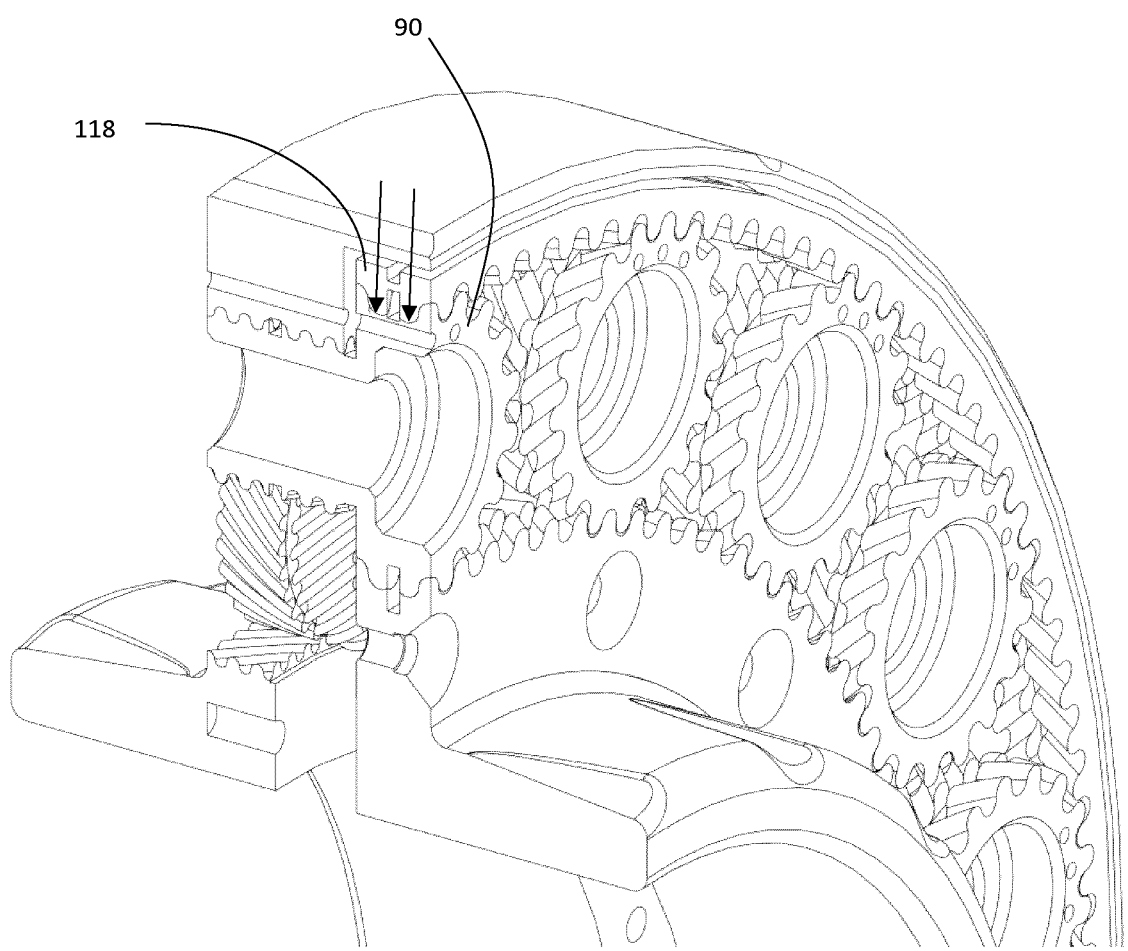
FIG. 18 is a cutaway view of an exemplary gearbox showing an idler ring.

As shown in FIG. 18, an idler ring 118 around the larger diameter outer planet gear teeth on larger gear 90 can be inserted to prevent separation between planet gears and input sun gear teeth as gears are energized.

Symmetric Configuration

Figure 19:
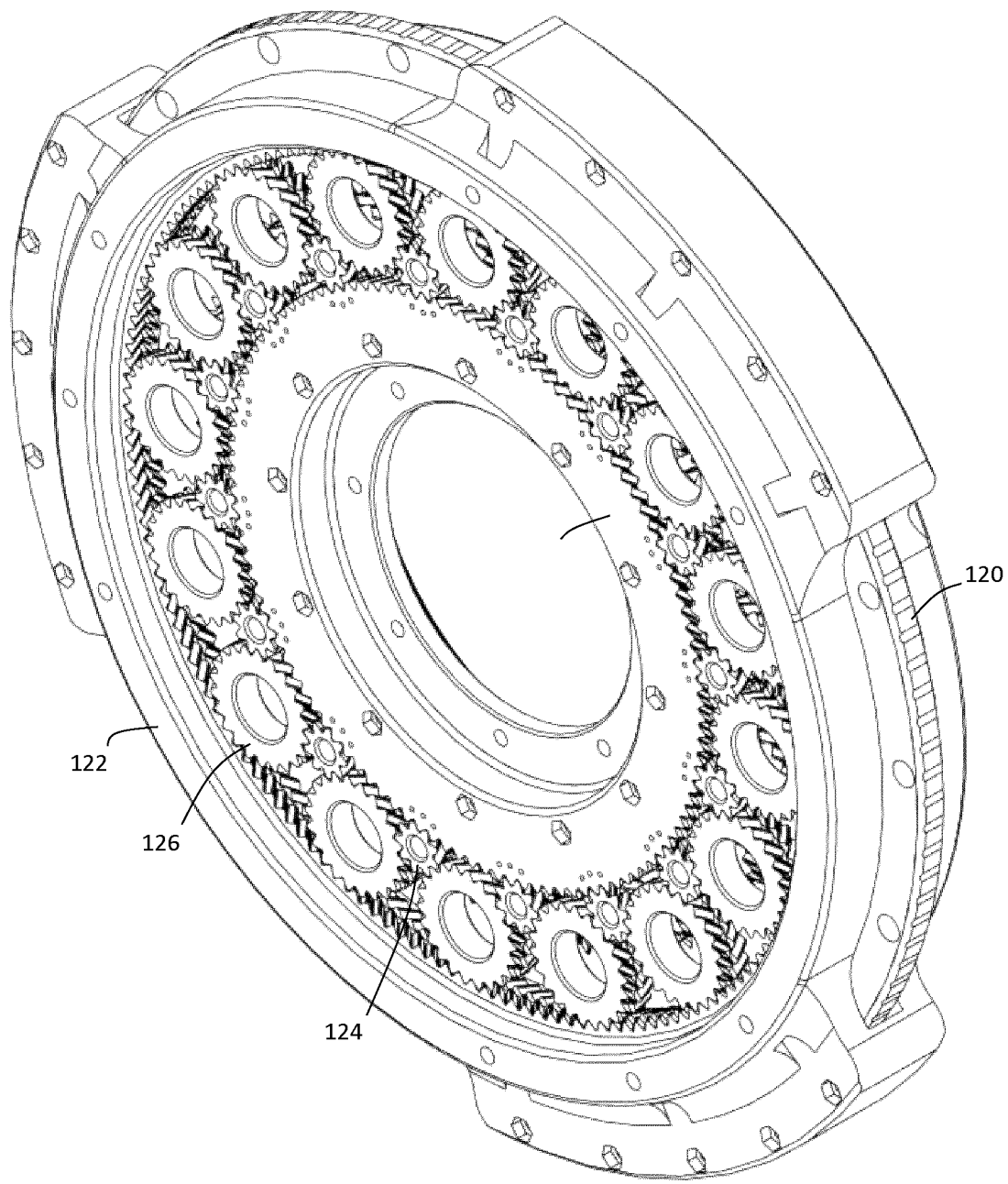
FIG. 19 is an isometric view of an exemplary symmetric gearbox.
Figure 20:
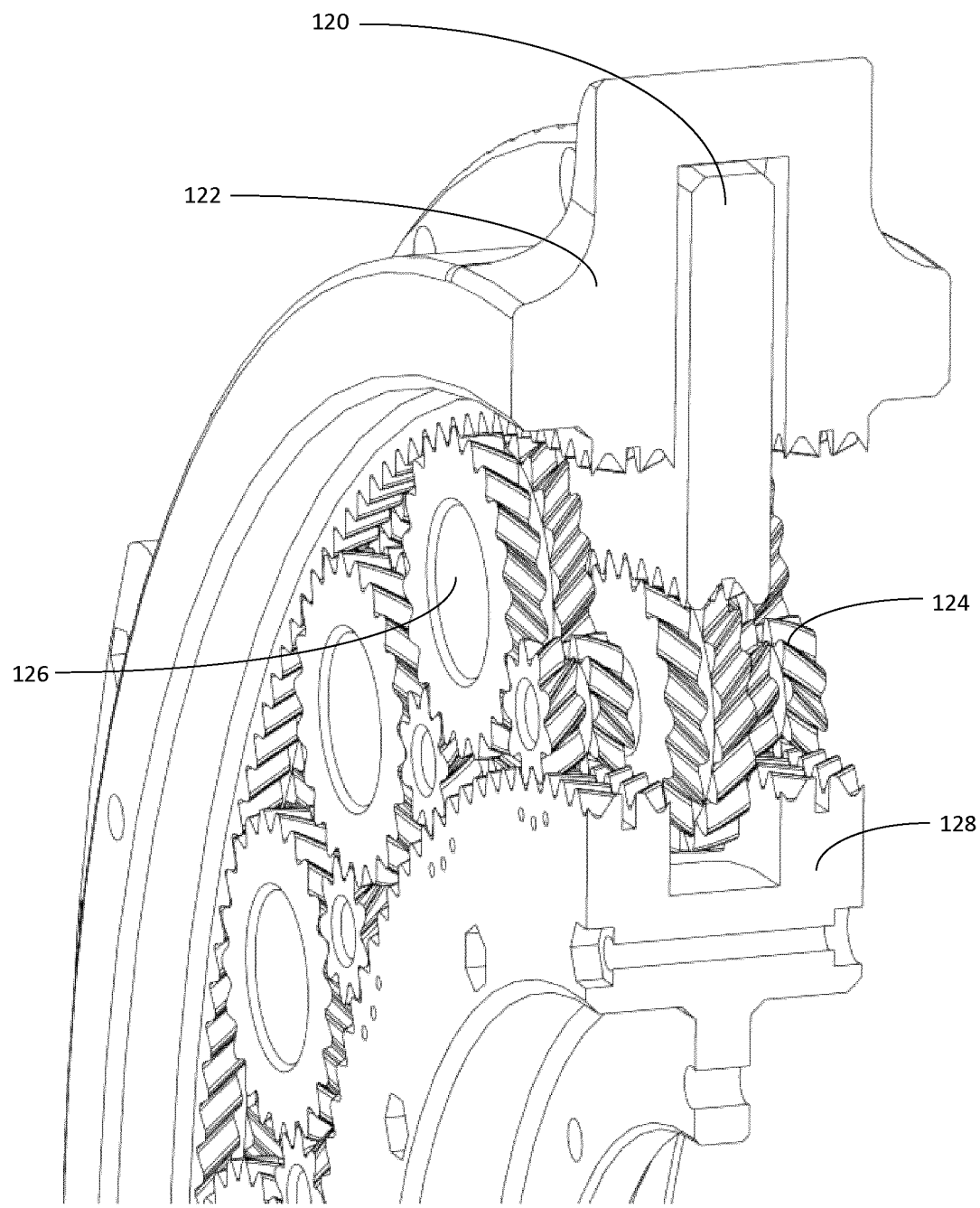
FIG. 20 is an isometric cutaway view of the symmetric gearbox of FIG. 16.

To prevent bending of the planets, the self-energizing gears can be positioned on either side of the input as shown in FIGS. 19 and 20. This configuration ensures that the planets stay parallel to the central axis of the gearbox. An outer input ring 120 is surrounded on both sides by stationary rings 122 and meshes with inner planet gears 124 to drive the inner planet gears 124. The inner planet gears 124 and outer planet gears 126 form a two row roller system to drive an output sun ring 128 relative to the stationary rings 122.

Input Ring Meshing at Main Roller Diameter

Figure 21:
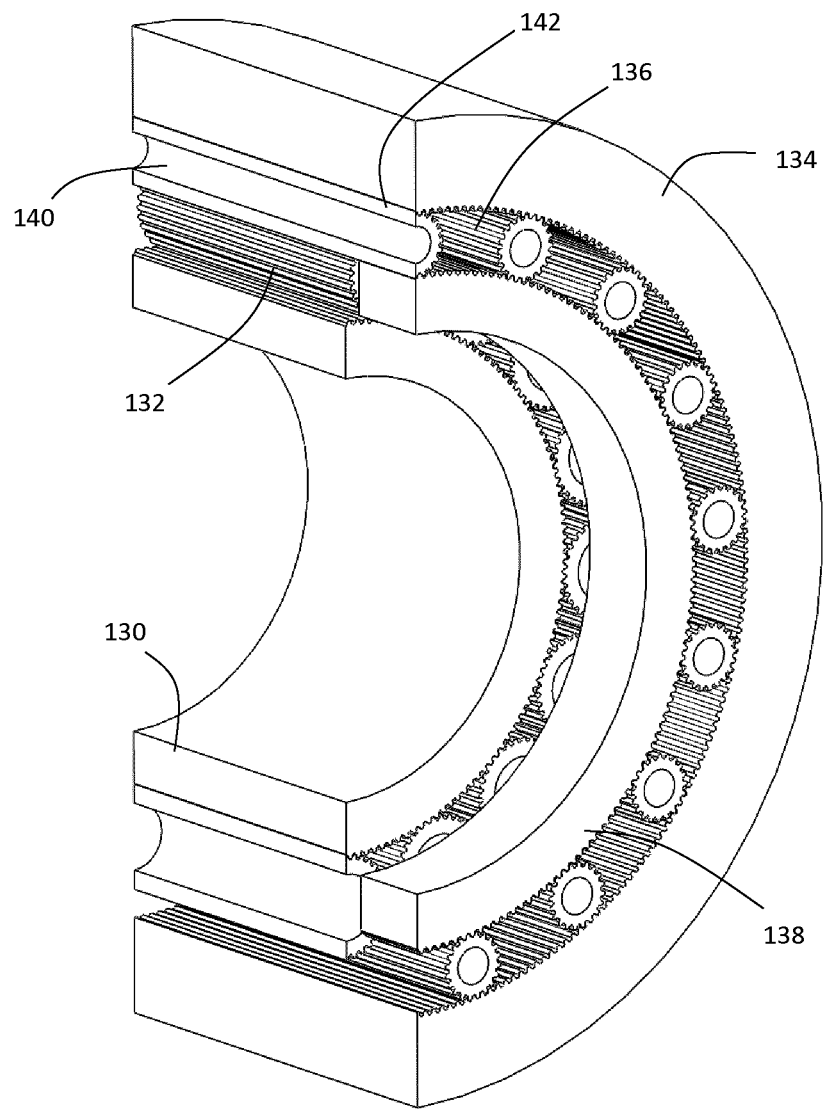
FIG. 21 is an isometric cutaway view of an exemplary gearbox with an asymmetric sun input.

FIG. 21 shows a cutaway isometric view of a nonlimiting exemplary embodiment of a single-sided input self-energizing gearbox. An inner ring 130, here a fixed ring, is in contact with an array of geared inner rollers 132. The outer ring 134, here an output ring, is also in geared contact with an array of geared outer rollers 136, and each of the geared outer rollers 136 is in contact with two geared inner rollers 132. Input torque is supplied using a geared input ring 138. In the embodiment shown, the geared input ring 138 has a radially outward facing portion in geared contact with the outer rollers. In this embodiment the outer rollers 136 have the same diameter in a first portion 140 that meshes with the inner rollers 132 and a second portion 142 that meshes with the input ring 138. Both the first portion 140 and second portion 142 mesh with the outer ring 134. Here the first and second portions include respective ends of the roller 136, but a symmetric arrangement such as shown in FIG. 20 could also be used. The engagement of the outer rollers with the outer ring gear all the way along their length helps to keep the rollers aligned. In the embodiment shown a single gear mesh covers both first portion 140 and second portion 142, but these portions could also have separate gear meshes. The embodiment shown has straight cut gears but helical gears could also be used, and also herringbone gears as described above.

When torque is applied to the input ring 138, there is a torsional twisting load transferred to the outer rollers 136, in addition to a rotational torque transfer to each of the rollers around their individual axes. As a result of the self-energizing (or camming) effect between the inner ring 130 and outer ring 134 through the two rows of rollers, the gears on two rows of rollers and the inner ring 130 and outer ring 134 are forced into engagement proportionally more as the torque output of the device increases. At a certain length of outer geared roller and a certain reduction ratio, the self-energizing effect which causes the gears to mesh together will have a greater straightening effect on the outer rollers than the twisting effect of the input from the input sun gear 138. The length of the longest rollers may correspond to an overall width of the device in the axial direction. This combination of width and reduction ratio can be calculated by someone skilled in the art to ensure that the meshing of the outer rollers 136 with the outer ring 134 straightens the outer rollers 136 when torque is applied to the input gear 138 as a result of the output torque that is transferred from the inner ring 130 to the outer ring 134 which causes the camming effect to push the gears into mesh rather than the separating force of the gears causing them to unmesh which would allow them to twist. Because of the gear ratio of the gearbox, the input torque on the input gear 138 will be significantly lower than the torque transferred through the planets 136 and 132. At a ratio of 7:1, the input torque would be roughly $1/7$ of the output torque. As a result, the dominant force in the outer planet 136 will be the load due to the torque transfer from the inner ring 130 to the outer ring 134. The radial load component from the camming effect ensures that the contacting gear tooth of the outer planet 136 is forced radially into the corresponding gear tooth in the outer ring 134. This radial load causes the straightening effect that counteracts the twisting effect due to the input torque from the input gear 138. This effect is stronger with a higher pressure angle in the gear teeth or a higher camming angle due to the resulting increase of radial load in the gears.

The greater the aspect ratio of the pinon length to pinion diameter, the less likely they are to twist as a result of the twisting force from the sun ring input. This relationship exists for two reasons. Generally speaking, the greater the aspect ratio for a given gearbox OD and width, the smaller the pinon diameter and therefore the higher the reduction ratio. As a general trend, the higher the reduction ratio, the greater the radial forces on the pinons which can be used to generate a deeper mesh between the pinons and the rings as compared to the decreased twisting force that is generated by the input of the sun, because of the increased reduction ratio which requires lower torque at the sun ring input, and therefore the greater the aligning effect. For this reason, it is believed, by the inventor, that a pinion length-to-diameter ratio of greater than 1:1, 1.5:1, 2:1, 2.5:1, 3:1, 3.5:1, 4:1 is suitable for causing the pinons to self-align when the gearbox is transmitting torque from the sun input to the output ring, In an alternative arrangement, the outer ring 134 could be fixed and the inner ring 130 could be used as an output. This arrangement would perform in the same way although with a gear ratio reduced by 1 and with reversal of the output direction. Also, both the outer ring and inner ring could be movable and the gearbox will provide a differential between these as output, with a gearing ratio that depends on the movement of the inner and outer rings.

Another possibility is using the self energizing gearbox as a tool output device. Specifically, if a motor is attached to the sun gear input and if the inner ring is attached to a shaft that turns clockwise in the outer output ring is attached to a shaft that must turn counterclockwise, a reversing differential joint can be created.

It is understood that if the input ring meshes with the outside of the inner rollers 132, for example having first and second portions that mesh with the outer rollers and input ring respectively, both portions meshing with the inner ring 130, then the same principle would apply.

This design may make use of straight cut gear teeth, helical gear teeth, lobes, or other profiles.

A straight cut gear tooth design like that described above may be advantageous for assembly, with a significantly lower part count when compared to a herringbone design, and a design which allows the gears to be inserted into the assembly from one side.

The straight cut gear tooth design does not have an axial constraint on the planets like the herringbone design, and thus needs some mechanism to constrain the planets axially. This design makes use of fences (not shown in FIG. 21) on either axial end in order to prevent the planets from floating out of the gearbox axially. By crowning the axial end of the planets and adding lubrication, losses due to friction are minimized.

Load Sharing

In a typical planetary gearbox, it is expected that a number of planets greater than 3 would not share the load evenly without very precise tolerances. The self-energizing gearbox has more than 3 planet pairs and must have some mechanism to ensure that load sharing exists to best make use of the additional planets' strength. There are several mechanisms that this gearbox could take advantage of, with several non-limiting mechanisms described here which take advantage of the unusual load distribution of this gearbox.

One non-limiting mechanism of load sharing in the self-energizing gearbox is radial flexibility of the planets, the inner ring, or the outer ring, or any combination of these. Because of the camming effect of the planets described above, there is a strong radial load component within the gearbox, transmitted between the outer ring, planets, and inner ring. If any of these gears has radial flexibility, the gear will be able to compress under the radial load of the camming effect. Because of this flexibility, the tolerance band of the large number of planets can be taken up, allowing the planets to share load. This radial flexibility can come from a number of features or parameters, including, but not limited to, a thin wall, lower material stiffness, or gear tooth root extension such as a radial slot between the teeth.

No matter the load sharing mechanism, the higher the radial (camming) load, the more similar the planet load due to a greater load sharing effect. A higher radial load is present with a higher pressure angle of the gear tooth geometry as well as a higher camming angle of the planet contacts.

Another load sharing mechanism results from the 2 level planet construction of the gearbox. As the planets cam onto one another, the non-loaded planet-planet mesh between inner and outer planets acts to stabilize the loaded planet-planet mesh. As a result, it is believed that there is a small amount of shifting in the planet position prior to developing a high enough radial load to "lock" into place. This effect is expected to increase load sharing between the planets and be a stronger effect with a lower pressure angle.

Figure 22A:
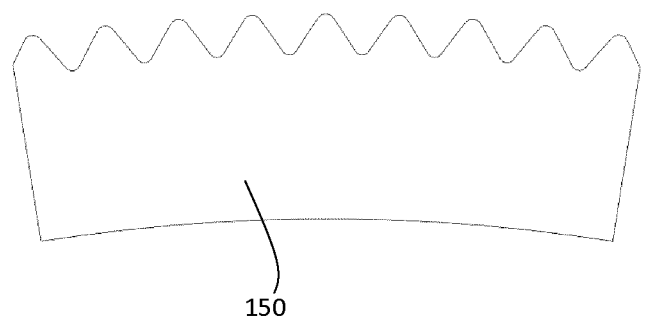
FIGS. 22A-22C show schematically a portion of a gear formed respectively in a normal shape out of soft material, in a thin shape, and in a shape having cuts at the gear roots.
Figure 22B:
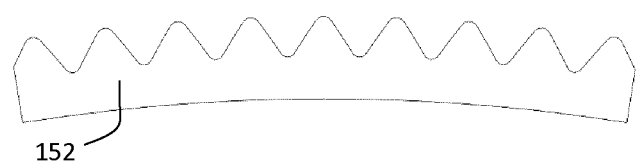
Figure 22C:
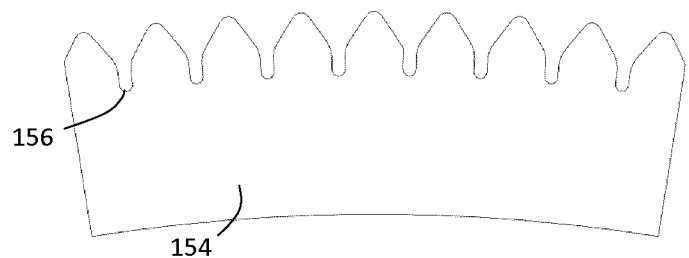

The stress distribution on the self-energized gearbox under load, would induce a radial load on these components. This radial load can be used to further deform these components and cause them to load share better by making the self-energized components more susceptible to deform. This can be achieved by reducing the overall stiffness of the self-energized components (i.e. outer ring, planets and the inner ring). Three different methods could be implemented to achieve this type of change in stiffness (FIG. 22A-22C). A first method uses a change in the material stiffness to reduce overall stiffness of such components; which means the components would deform more under the same radial load as well as become prone to deform under the same tangential load the gear teeth are undertaking. The deformation caused by the radial and tangential load would be advantageous towards a more efficient load sharing and an overall stiffer gearbox. The degree of stiffness that is sufficiently low will depend on the gear tolerances. 22A shows an example portion of a nominal thickness gear 150 that may be formed of a lower stiffness material. A second method uses a geometric approach (ex. thin walls) to change the overall stiffness of these components. This would make the components less stiff and more sensitive to deform under certain radial load. FIG. 22B shows an exemplary portion of a thinner walled gear 152. A third method uses yet another geometric approach where the wall thickness remains at nominal size, but the tooth geometry is revised to have a radial slot on the root. In this method, both radial and tangential loads have effect on gear flexibility which allows for more effective load sharing. FIG. 22C shows an exemplary portion of a nominal thickness gear 154 with radial slots 156 on the roots.

The disclosed design may eliminate the need for a planet carrier and bearings as the input is supplied by the input ring, circumferential location is supplied by the gears, and axial location may be supplied by, for example, fences, tapered rollers, or by portions with different angled gears.

By eliminating the need for a planet carrier and bearings, the tolerance stack-up of these locating elements is eliminated. This allows for much more consistent meshing of greater than three planet gears with the ring gears.

Tolerance stack up elements which are eliminated include the location of the planet carrier pins. The concentricity of the planet carrier, the runout of the bearings, and the eccentricity of the bearing bores in each of the pinions with the pitch circle of the gears.

In addition to eliminating these tolerance stack up factors, radial flexibility can be introduced into the design in a number of different ways. Introducing radial flexibility has the effect of reducing the load variation from pinion to pinion that would result from variations in pinion sizes.

Also as a result of eliminating the planet carrier, for example, the planets can be hollow and therefore radially flexible.

Two Stage Gearbox

Figure 23:
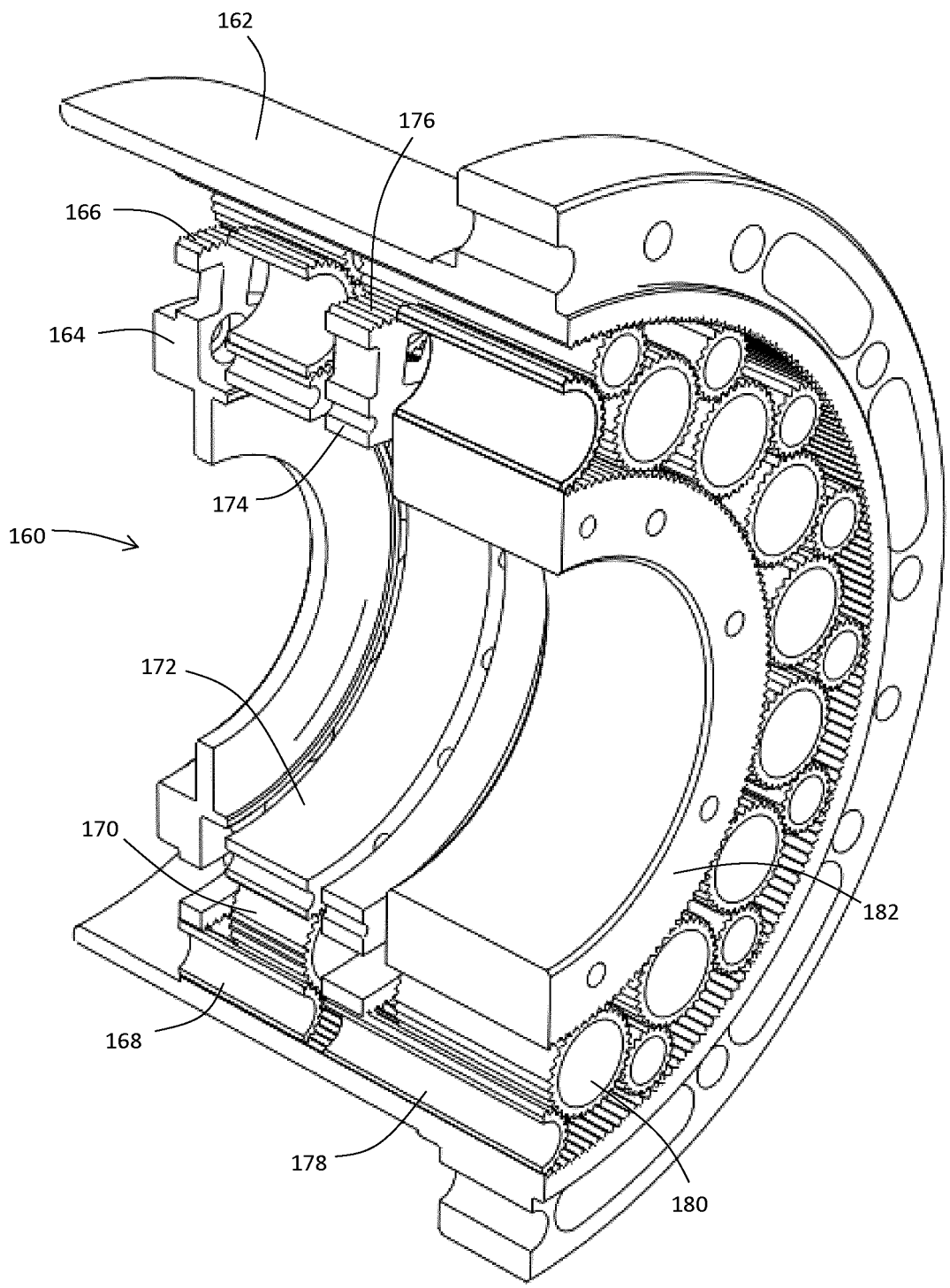
FIG. 23 is an isometric cutaway view of a two-stage gearbox.
Figure 24:
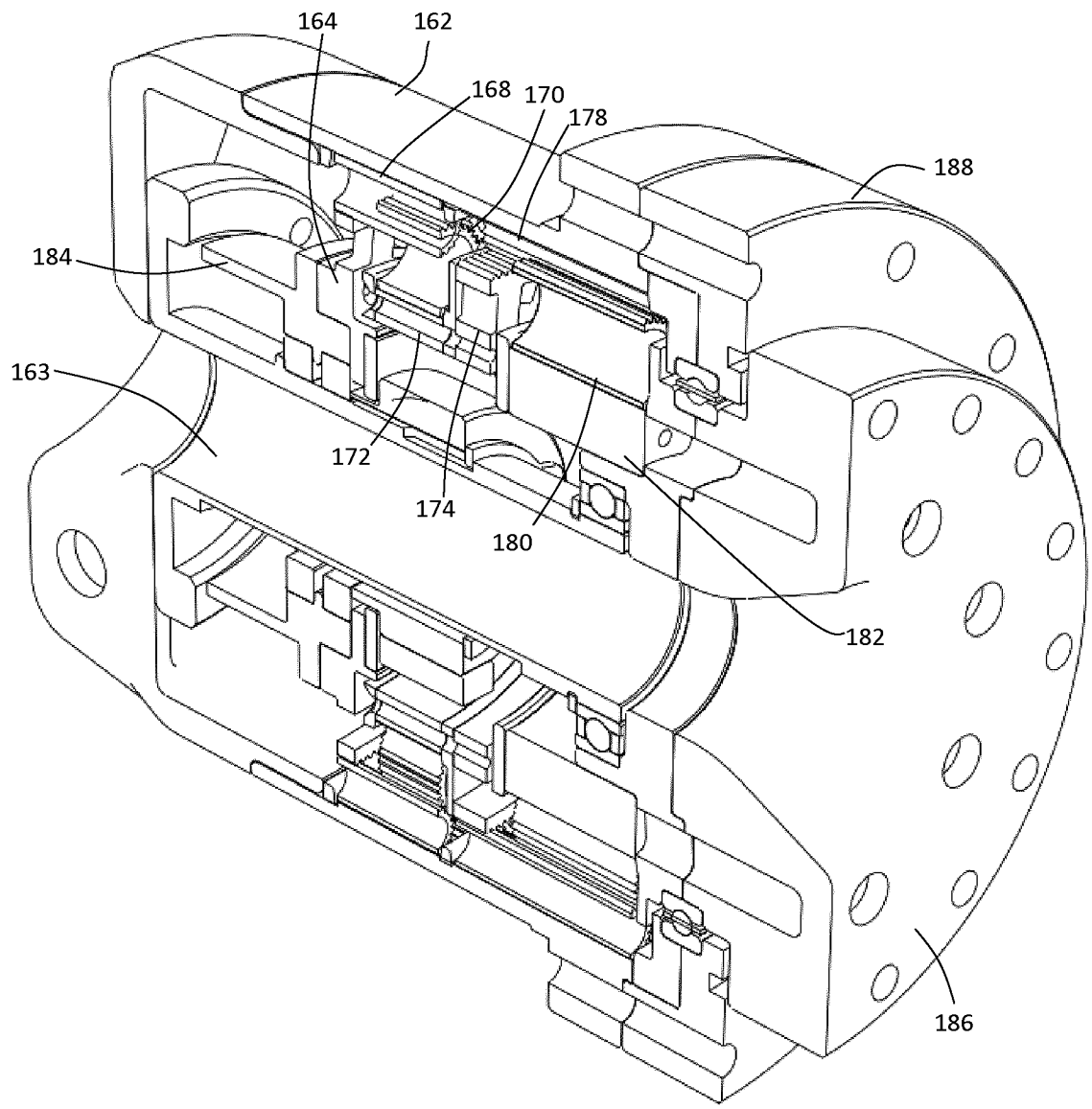
FIG. 24 is an isometric cutaway view of an actuator including the two stage gearbox of FIG. 23.
Figure 25:
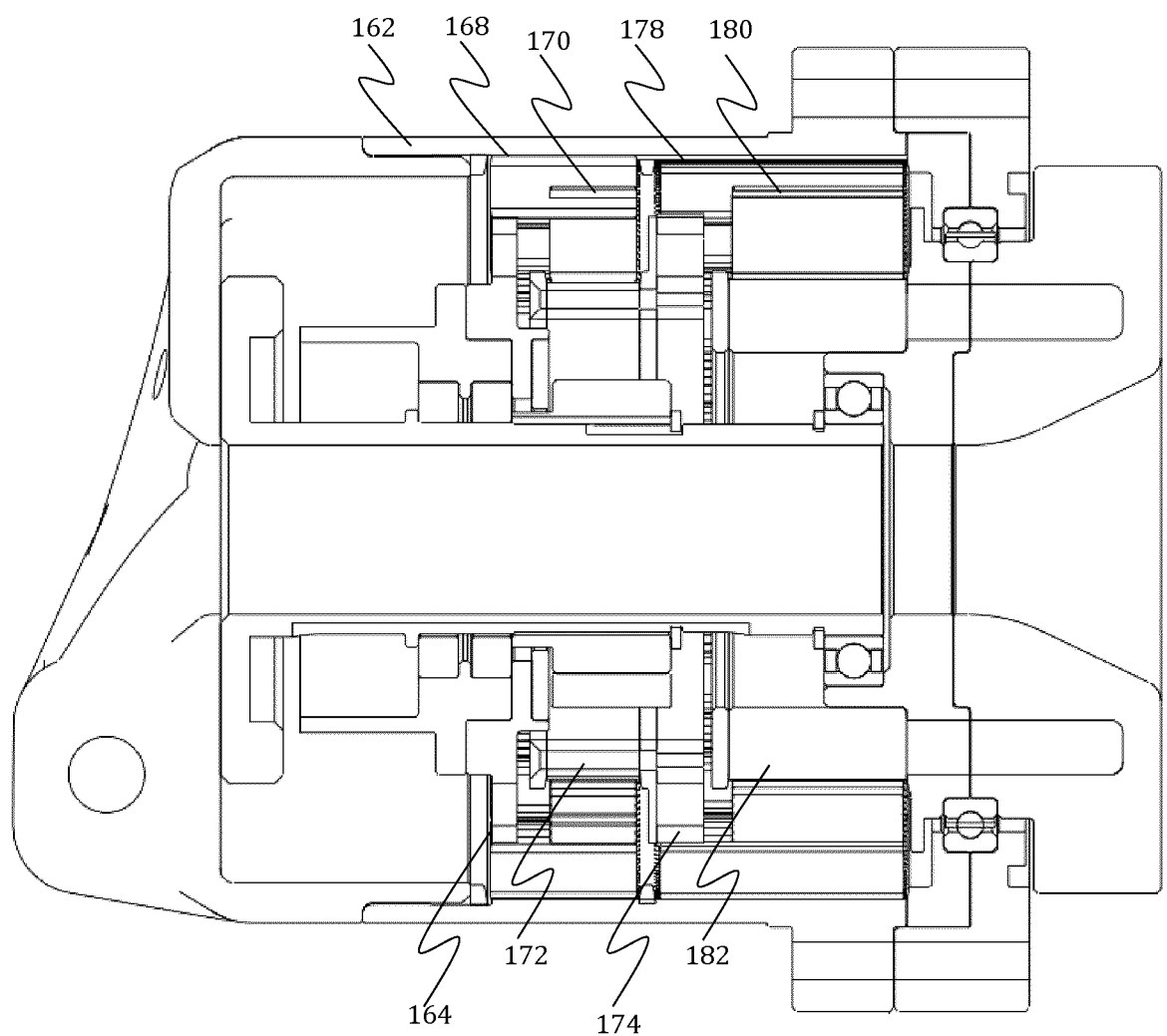
FIG. 25 is a side section view of the actuator of FIG. 24.

A gearbox as described above can be made a two stage gearbox as shown in FIGS. 23-25. FIG. 23 is an isometric cutaway view of an exemplary two stage gearbox 160. As shown in FIG. 23, an outer housing 162 acts as a common outer stationary gear for both stages. An input ring 164 has an outer surface 166 that meshes with first stage outer gears 168. First stage inner gears 170 mesh with first stage inner ring 172 to drive inner ring 172 with respect to the outer housing 162. This first stage inner ring is connected to, and may be formed in one piece with, a second stage input gear 174 which has an outer surface 176 that meshes with second stage outer gears 178. Second stage inner gears 180 mesh with inner output gear 182 to drive inner output gear 182 relative to outer housing 162, which differential movement provides the output of the two stage gearbox.

FIG. 24 shows an actuator using the two-stage gearbox shown in FIG. 23. In addition to the components shown in FIG. 23, FIG. 24 shows a flange 184 connected to input ring 164 and inner housing component 163 connected to outer housing 162. An electric motor rotor and stator, not shown, may be connected to the flange 184 and inner housing 163 to drive the flange 184 relative to the inner housing component 163 to drive the two stage gearbox. Also shown in FIG. 24 are an output cap 186 connected to inner output gear 182 and a fixed outer cap 188 connected to outer housing 162. FIG. 25 shows a side cross section view of the embodiment of FIG. 24.

If the outer ring gear of stage one is the same pitch diameter and tooth number and one piece with the other outer ring gear of state two, then the inner ring gear from the first stage is connected to the input gear of the second stage and the inner ring gear of the second stage becomes the output of the second stage.

If the inner ring gear is shared by both stages, then the outer ring gear of the first stage is linked to the input gear of the second stage, and the outer ring gear of the second stage becomes the output of the device. More than two stages can be connected in this way.

Tapered Embodiment

Another exemplary embodiment of the single sided self-energizing gearbox is the tapered design shown in FIGS. 26-29. In this design, the cylindrical gear teeth of the more basic single-sided gearbox design are replaced with tapered gears, with the gear contacts remaining the same as described above, but tapered.

Figure 26:
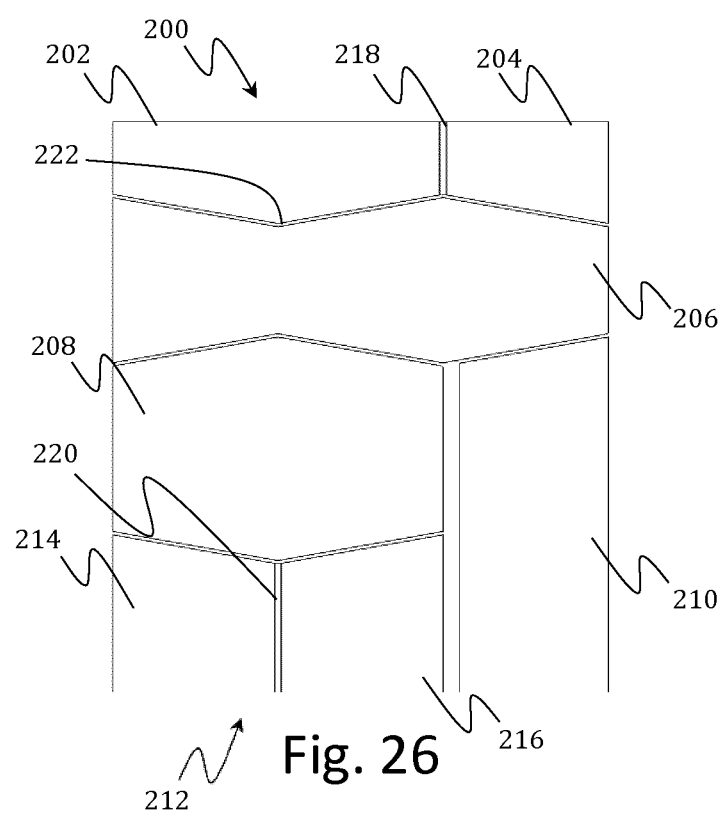
FIG. 26 is a schematic side section view of a gearbox having tapered rollers.

By tapering the gears, the planets become axially constrained and backlash can be reduced or removed by adjusting shims in the locations shown in FIG. 26. The gearbox would otherwise function in the same way as a non-tapered version.

The tapered gear profile is currently difficult to manufacture by traditional gear manufacturing methods such as hobbing or skiving. As such, another method such as but not limited to injection molding, surface milling, powdered metallurgy, or gear rolling, will likely be used. There is also a potential increase in part count due to manufacturing limitations with these tapers.

Either the tapered or non-tapered tooth profiles may make use of straight, or helical gears or lobes. It may be beneficial to use a helix angle on the tapered gears due to the manufacturing method or to optimize strength or noise.

FIG. 26 shows a schematic cross section of a tapered helical self-energized gearbox showing how the gear components are split due to manufacturing and assembly considerations and where shims may be inserted. Note that this is not a true cross section as normally the inner and outer gears would not mesh with the inner and outer races at the same circumferential position. Outer race 200 in this embodiment is split into first component 202 in contact with the outer gears 206 at an axial position corresponding to inner gears 208, and second component 204 in contact with the outer gears 206 at an axial position corresponding to input gear 210. Inner race 212 is also shown split into components 214 and 216. An outer shim 218 is shown between components 202 and 204 of the outer race 200 and an inner shim 220 is shown between components 214 and 216 of inner race The longer (outer) gears may also have a split, not shown, at their necks 222 in order to ease manufacturing using injection molding, if injection molding is chosen as the manufacturing method.

Figure 27:
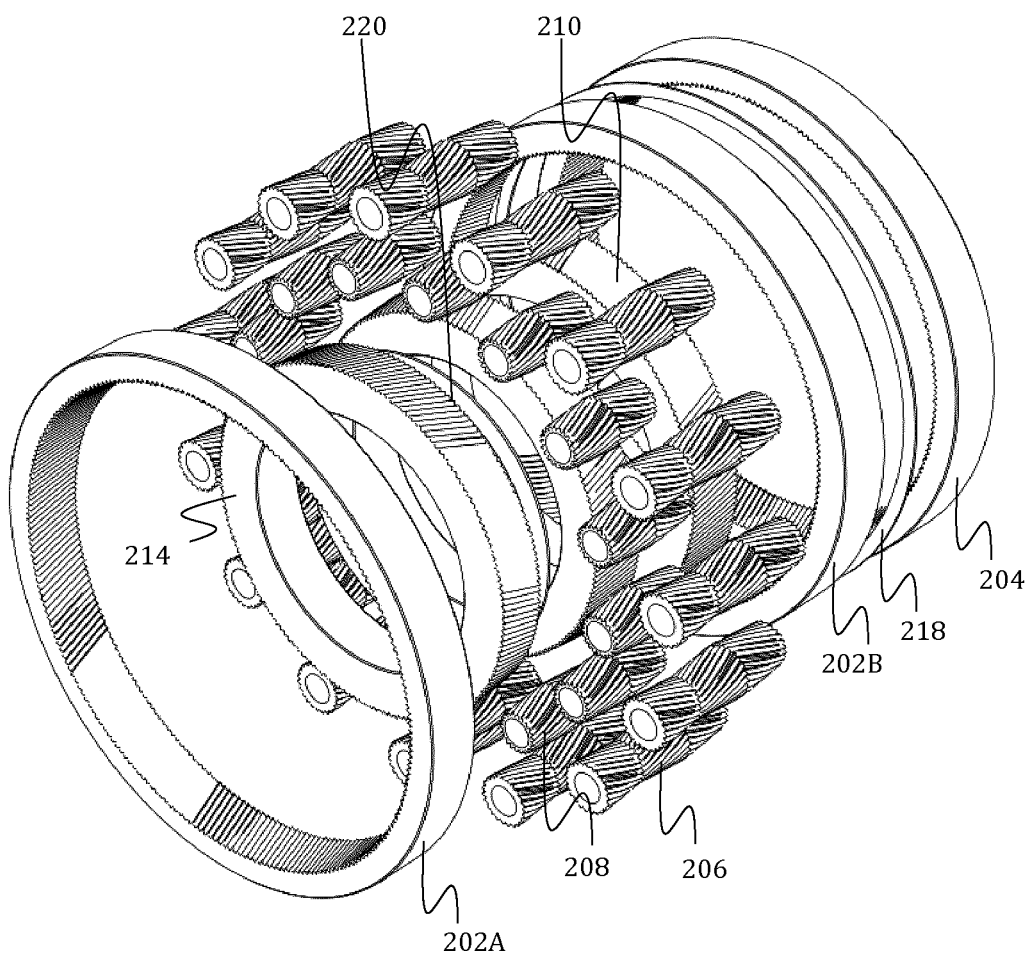
FIG. 27 is an exploded isometric view of a gearbox having tapered rollers.

FIG. 27 shows an isometric exploded view of a gearbox as shown schematically in FIG. 26, with the additional change that first component 202 of the outer race is here shown split into two further components 202A and 202B.

Figure 28:
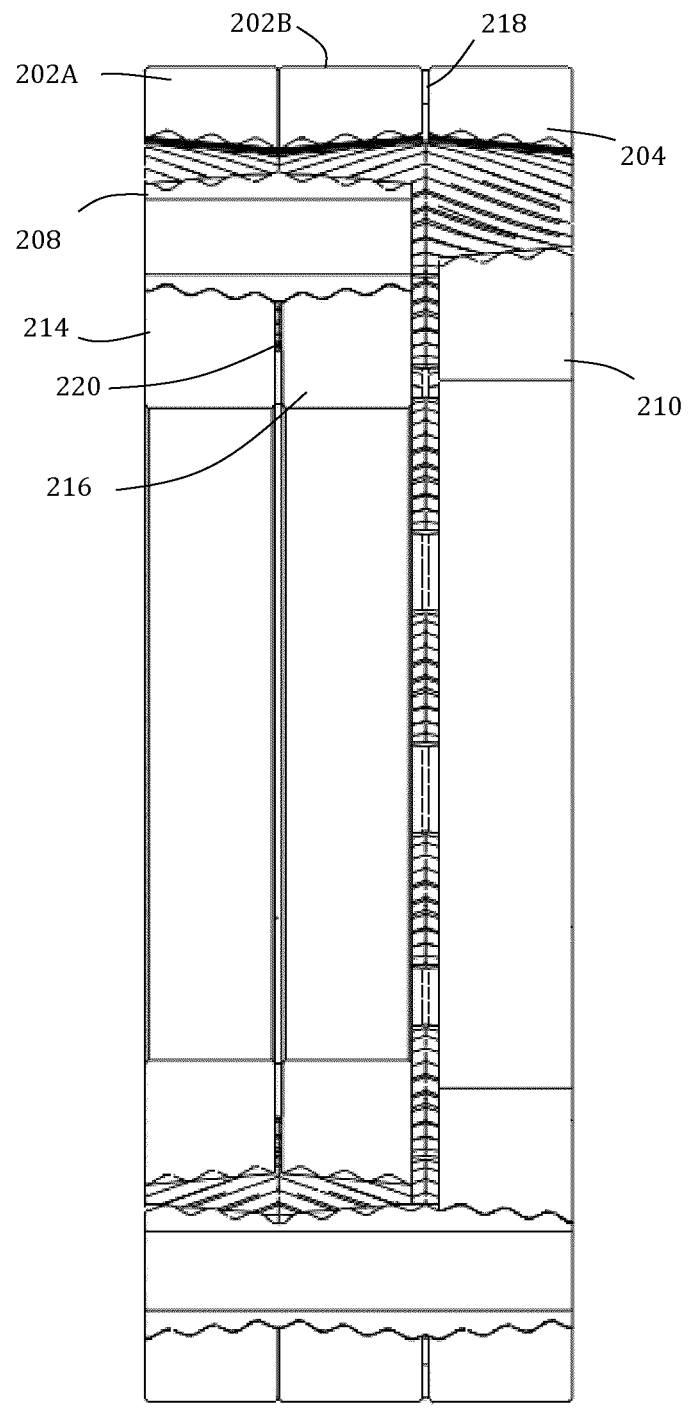
FIG. 28 is a side section view of the gearbox of FIG. 27.
Figure 29:
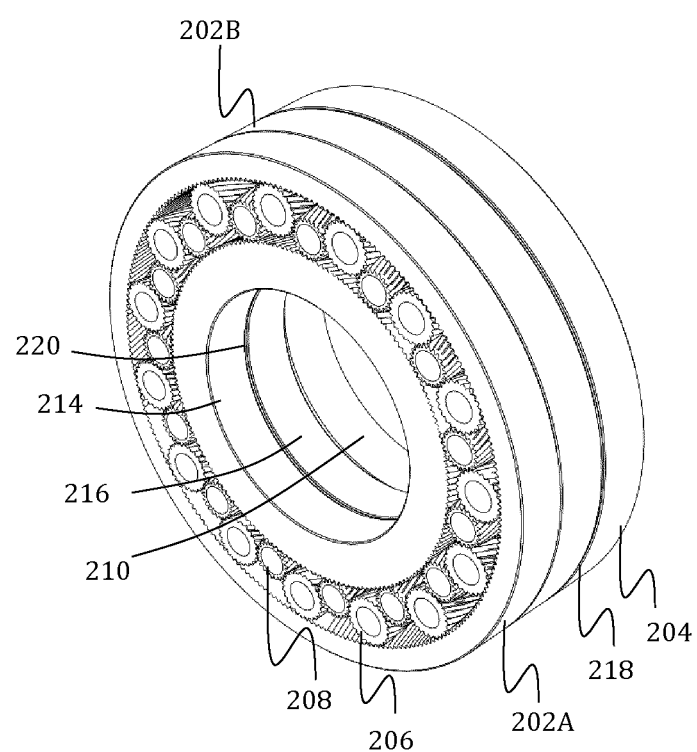
FIG. 29 is an isometric view of the gearbox of FIG. 27.

FIG. 28 is a side cutaway view of the gearbox of FIG. 27, with the outer rollers removed. FIG. 29 is an isometric view of the gearbox of FIG. 27.

Tapered gears may be used with straight or helical, including herringbone, gears. The taper, in addition to providing some axial location, allows backlash adjustment with shims. Herringbone teeth allow more precise positive axial positioning of the pinions and ring gears. Used together, all of the benefits are realized but some applications will benefit from one or the other.

As shown for example in FIG. 21, single sided (non-symmetrical) input is possible without the herringbone or tapered teeth, due to the self energizing effect that causes the teeth to engage and therefore eliminate the twisting of the gear axes.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A speed change device comprising:
an inner race having an outer surface and defining an axis;
an outer race having an inner surface and coaxial with the inner race;
a set of orbital rollers including inner rollers in geared contact with the outer surface of the inner race and outer rollers in geared contact with the inner surface of the outer race, each and every inner roller being in geared contact with two outer rollers, and each and every outer roller being in geared contact with two inner rollers;
at least one of the outer surface of the inner race and the inner surface of the outer race being formed of two angled gear surfaces having different helix angle, wherein the two angled gear surfaces are positioned on axially adjacent components; and
an input ring coaxial with the inner race and outer race and in geared contact with the inner rollers or with the outer rollers, wherein the input ring is formed of two axially adjacent components each having a respective input angled gear surface, the respective input angled gear surfaces having different helix angles.

2. The speed change device of claim 1 in which the two angled gear surfaces have opposite helix angle to together form a herringbone gear surface.

3. A method of assembling a speed change device, the method comprising the steps of:
placing outer orbital rollers in geared contact with an inner surface of an outer race;
placing a set of inner orbital rollers in geared contact with the outer orbital rollers, each and every inner orbital roller being in geared contact with two outer orbital rollers, and each and every outer orbital roller being in geared contact with two inner orbital rollers;
placing a first component of an inner race in geared contact with the set of inner orbital rollers and coaxial with the outer race, the first component having a first angled gear surface;
placing a second component of the inner race in geared contact with the set of inner orbital rollers and coaxial with the outer race, the second component having a second angled gear surface, the first angled gear surface and the second angled gear surface having different helix angle; and
placing an input gear comprising a first input gear component having a first angled input gear surface and a second input gear component having a second angled input gear surface, in geared contact with the outer orbital rollers and coaxial with the outer race at least in part by:
placing the first input gear component coaxial with the outer orbital rollers and with the first angled input gear surface in geared contact with the outer orbital rollers; and
placing the second input gear component coaxial with the outer orbital rollers and with the second angled input gear surface in geared contact with the outer orbital rollers and with the second angled input gear surface in geared contact with the outer orbital rollers, the first angled input gear surface and the second angled input gear surface having different helix angles.

4. The method of claim 3 in which the first angled gear surface and the second angled gear surface have opposite helix angle to together form a herringbone gear surface.

5. The method of claim 3 in which the first angled input gear surface is placed into geared contact with the outer orbital rollers before the step of placing the set of inner orbital rollers in geared contact with the outer orbital rollers, and the second angled input gear surface is placed into geared contact with the outer orbital rollers after the steps of placing the first input gear component and the second input gear component of the inner race in geared contact with the set of inner orbital rollers.

6. A method of assembling a speed change device, the method comprising the steps of:
   placing a set of inner orbital rollers in geared contact with an outer surface of an inner race;
   placing a set of outer orbital rollers in geared contact with the set of inner orbital rollers, each and every outer orbital roller being in geared contact with two inner orbital rollers, and each and every inner orbital roller being in geared contact with two outer orbital rollers;
   placing a first component of an outer race in geared contact with the set of inner orbital rollers and coaxial with the inner race, the first component having a first angled gear surface;
   placing a second component of an outer race in geared contact with the outer orbital rollers and coaxial with the inner race, the second component having a second angled gear surface, the first angled gear surface and the second angled gear surface having different helix angle; and
   placing an input gear in geared contact with the set of inner orbital rollers and coaxial with the inner race.

7. The method of claim 6 in which the input gear comprises a first input gear component having a first angled input gear surface and a second input gear component having a second angled input gear surface, and the step of placing an input gear in geared contact with the set of inner orbital rollers and coaxial with the inner race comprises placing the first input gear component coaxial with the set of inner orbital rollers and with the first angled input gear surface in geared contact with the set of inner orbital rollers, and placing the second input gear component coaxial with the set of inner orbital rollers and with the second angled input gear surface in geared contact with the set of inner orbital rollers, the first angled input gear surface and the second angled input gear surface having different helix angle.

8. The method of claim 7 in which the first angled input gear surface is placed into geared contact with the set of inner orbital rollers before the step of placing the set of outer orbital rollers in geared contact with the set of inner orbital rollers, and the second angled input gear surface is placed into geared contact with the set of inner orbital rollers after the steps of placing the first input gear component and the second input gear component of the outer race in geared contact with the outer orbital rollers.

9. A speed change device comprising:
   an inner race having an outer surface and defining an axis;
   an outer race having an inner surface and coaxial with the inner race;
   a set of orbital rollers including inner rollers in geared contact with the outer surface of the inner race and outer rollers in geared contact with the inner surface of the outer race, each and every inner roller being in geared contact with two outer rollers, and each and every outer roller being in geared contact with two inner rollers, and wherein the inner rollers and the outer rollers are formed of a material selected to be of sufficiently low stiffness to cause the set of orbital rollers to deform to share load given a set of tolerances to which the set of orbital rollers are formed;
   an input ring coaxial with the inner race and outer race and in geared contact with the inner rollers or with the outer rollers; and
   in which one of A or B, where:
      A is the outer rollers are longer than the inner rollers and each outer roller has a respective first portion that meshes with the inner rollers with which it is in contact, and the input ring has an outer surface that meshes with a respective second portion of each outer roller with which it is in contact, both the first portion and the second portion of the outer rollers meshing with the outer race; and
      B is inner rollers are longer than the outer rollers and each inner roller has a respective first portion that meshes with the outer rollers with which it is in contact, and the input ring has an inner surface that meshes with a respective second portion of each inner roller with which it is in contact, both the first portions and the second portions of the inner rollers meshing with the inner race.

10. A speed change device comprising:
    a plurality of speed change devices each comprising:
       an inner race having an outer surface and defining an axis;
       an outer race having an inner surface and coaxial with the inner race;
       a set of orbital rollers including inner rollers in geared contact with the outer surface of the inner race and outer rollers in geared contact with the inner surface of the outer race, each and every inner roller being in geared contact with two outer rollers, and each and every outer roller being in geared contact with two inner rollers;
       an input ring coaxial with the inner race and outer race and in geared contact with the inner rollers or with the outer rollers; and
       in which one of A or B where:
          A is the outer rollers are longer than the inner rollers and each outer roller has a respective first portion that meshes with the inner rollers with which it is in contact, and the input ring has an outer surface that meshes with a respective second portion of each outer roller with which it is in contact, both the first portion and the second portion of the outer rollers meshing with the outer race; and
          B is inner rollers are longer than the outer rollers and each inner roller has a respective first portion that meshes with the outer rollers with which it is in contact, and the input ring has an inner surface that meshes with a respective second portion of each inner roller with which it is in contact, both the first portions and the second portions of the inner rollers meshing with the inner race;
    wherein the plurality of speed change devices are arranged as plural stages such that the inner race of each stage other than a first stage of the plural stages is connected to an input ring of a successive stage.

11. The speed change device of claim 10 in which the outer races of successive stages are connected together.

12. A speech change device comprising:
a plurality of speed change devices each comprising:
an inner race having an outer surface and defining an axis;
an outer race having an inner surface and coaxial with the inner race;
a set of orbital rollers including inner rollers in geared contact with the outer surface of the inner race and outer rollers in geared contact with the inner surface of the outer race, each and every inner roller being in geared contact with two outer rollers, and each and every outer roller being in geared contact with two inner rollers;
an input ring coaxial with the inner race and outer race and in geared contact with the inner rollers or with the outer rollers; and
in which one of A or B where:
A is the outer rollers are longer than the inner rollers and each outer roller has a respective first portion that meshes with the inner rollers with which it is in contact, and the input ring has an outer surface that meshes with a respective second portion of each outer roller with which it is in contact, both the first portion and the second portion of the outer rollers meshing with the outer race; and
B is inner rollers are longer than the outer rollers and each inner roller has a respective first portion that meshes with the outer rollers with which it is in contact, and the input ring has an inner surface that meshes with a respective second portion of each inner roller with which it is in contact, both the first portions and the second portions of the inner rollers meshing with the inner race;
wherein the plurality of speed change devices are arranged as stages such that the outer race of each stage other is connected to the input ring of successive stage.

* * * * *